(12) United States Patent
Gelowitz et al.

(10) Patent No.: US 8,388,737 B2
(45) Date of Patent: Mar. 5, 2013

(54) METHOD AND ABSORBENT COMPOSITION FOR RECOVERING A GASEOUS COMPONENT FROM A GAS STREAM

(75) Inventors: Don Gelowitz, Regina (CA); Paitoon Tontiwachwuthikul, Regina (CA); Raphael Idem, Regina (CA)

(73) Assignee: University of Regina, Regina (CA)

( * ) Notice: Subject to any disclaimer, the term of this patent is extended or adjusted under 35 U.S.C. 154(b) by 377 days.

(21) Appl. No.: 12/598,598

(22) PCT Filed: May 29, 2008

(86) PCT No.: PCT/CA2008/001029
§ 371 (c)(1),
(2), (4) Date: Mar. 30, 2010

(87) PCT Pub. No.: WO2008/144918
PCT Pub. Date: Dec. 4, 2008

(65) Prior Publication Data
US 2010/0229723 A1 Sep. 16, 2010

Related U.S. Application Data

(60) Provisional application No. 60/940,529, filed on May 29, 2007.

(51) Int. Cl.
*B01D 53/14* (2006.01)

(52) U.S. Cl. .......... 95/180; 95/181; 95/182; 95/183; 95/193; 95/209; 95/228; 95/232; 95/233; 95/235; 95/236

(58) Field of Classification Search .......... 95/162, 95/149, 183, 178–180, 193–194, 209, 181, 95/182, 232, 233, 235, 236
See application file for complete search history.

(56) References Cited

U.S. PATENT DOCUMENTS

| | | | | |
|---|---|---|---|---|
| 3,225,519 | A | * | 12/1965 | Stotler .......... 95/161 |
| 4,035,166 | A | * | 7/1977 | Van Hecke .......... 95/163 |
| 5,339,633 | A | * | 8/1994 | Fujii et al. .......... 60/648 |
| 6,102,987 | A | | 8/2000 | Gross et al. |
| 6,228,145 | B1 | * | 5/2001 | Falk-Pedersen et al. .......... 95/44 |
| 7,004,997 | B2 | * | 2/2006 | Asprion et al. .......... 95/235 |
| 2007/0148068 | A1 | * | 6/2007 | Burgers et al. .......... 423/220 |
| 2008/0127831 | A1 | * | 6/2008 | Rochelle et al. .......... 96/181 |
| 2010/0092359 | A1 | * | 4/2010 | Svendsen et al. .......... 423/230 |

FOREIGN PATENT DOCUMENTS

| | | |
|---|---|---|
| CA | 1068638 A1 | 12/1979 |
| CA | 2261819 C | 2/1998 |
| CA | 2605649 A1 | 11/2006 |
| CA | 2613251 A1 | 1/2007 |
| EP | 1911505 A1 | 4/2008 |
| GB | 2062597 A * | 5/1981 |
| GB | 2062597 A | 5/1981 |

OTHER PUBLICATIONS

Flash High-Pressure Condensate to Regenerate Low-Pressure Steam U.S. Department of energy, Steam Tip Sheet #12, Jan. 2006 (Jan. 31, 2006) URL: <http://www1.eere.energy.gov/industry/bestpractices/pdfs/steam12_lowpressure_steam.pdf>.
International Search Report for PCT/CA2008/001029, mailed Aug. 19, 2008.
Written Opinion of the International Searching Authority, for PCT/CA2008/001029, mailed Aug. 19, 2008.

* cited by examiner

*Primary Examiner* — Duane Smith
(74) *Attorney, Agent, or Firm* — Gowling Lafleur Henderson LLP

(57) ABSTRACT

A method and apparatus for recovering a gaseous component from an incoming gas stream is described. The incoming gas stream is contacted with a lean aqueous absorbing medium to absorb at least a portion of the gaseous component from the incoming gas stream to form a lean treated gas stream and a rich aqueous absorbing medium. At least a portion of the gaseous component is desorbed from the rich aqueous absorbing medium at a temperature to form an overhead gas stream and a regenerated aqueous absorbing medium. At least a portion of the overhead gas stream is treated to recover a condensate stream. At least a portion of the condensate stream is used to form a heated stream. At least a portion of the heated stream is recycled back to the desorbing step. Novel absorbing medium compositions to recover carbon dioxide and/or hydrogen sulfide are also described.

28 Claims, 26 Drawing Sheets

METHOD AND ABSORBENT COMPOSITION FOR RECOVERING A GASEOUS COMPONENT FROM A GAS STREAM

PRIORITY

This application claims the benefit of U.S. patent application No. 60/940,529 filed on 29 May 2007, the entirety of which is incorporated herein by this reference to it.

FIELD

This specification relates generally to methods and apparatuses for recovering a gaseous component from an incoming gas stream.

BACKGROUND

The following paragraphs are not an admission that anything discussed in them is prior art or part of the knowledge of persons skilled in the art.

Government regulations on the release of gaseous pollutants into the environment are becoming more stringent. Conventional methods and apparatuses for removing a gaseous pollutant from an incoming gas stream typically suffer from high energy demands.

INTRODUCTION

The following introduction is intended to introduce the reader to this specification but not to define any invention. One or more inventions may reside in a combination or subcombination of the apparatus elements or method steps described below or in other parts of this document. The inventor does not waive or disclaim his rights to any invention or inventions disclosed in this specification merely by not describing such other invention or inventions in the claims.

One aspect of a method for recovering a gaseous component from an incoming gas stream described in the specification comprises the step of contacting the incoming gas stream with a lean aqueous absorbing medium to absorb at least a portion of the gaseous component from the incoming gas stream to form a lean treated gas stream and a rich aqueous absorbing medium. The method further comprises the step of desorbing at least a portion of the gaseous component from the rich aqueous absorbing medium at a temperature to form an overhead gas stream and a regenerated aqueous absorbing medium. The method further comprises the step of treating at least a portion of the overhead gas stream to recover a first condensate stream. The method further comprises the step of using at least a portion of the first condensate stream to form a heated stream. The method further includes the step of recycling at least a portion of the heated stream back to the desorbing step.

In one aspect, heat is transferred from the incoming gas stream to the heated stream.

In another aspect, heat is transferred from the overhead gas stream to the heated stream.

In yet another aspect, the method further comprises the steps of introducing steam to provide heat for the desorbing step and to form a steam condensate and flashing the steam condensate to form a flashed steam and wherein heat is transferred from the flashed steam to the heated stream.

In a further aspect, heat is transferred from the regenerated aqueous absorbing medium to the heated stream.

In one aspect, the heated stream comprises the first condensate stream.

In another aspect, the heated stream comprises the rich aqueous absorbing medium derived by delivering at least a portion of the first condensate stream to the contacting step so that at least a portion of the first condensate stream combines with the lean aqueous absorbing medium to form the rich aqueous absorbing medium.

In yet another aspect, the method further comprises the step of treating at least a portion of the lean treated gas stream to recover a second condensate stream and wherein the heated stream comprises a mixed condensate stream derived by combining at least a portion of the first condensate stream with at least a portion of the second condensate stream to form the mixed condensate stream.

In one aspect, the heated stream comprises a rich vapor stream and a semi-lean aqueous absorbing medium derived by delivering at least a portion of the first condensate stream to the contacting step so that at least a portion of the first condensate stream combines with the lean aqueous absorbing medium to form the rich aqueous absorbing medium which is subsequently flashed to form the rich vapor stream and the semi-lean aqueous absorbing medium.

In another aspect, heat is transferred from the incoming gas stream to at least one of the rich aqueous absorbing medium or the semi-lean aqueous absorbing medium.

In yet another aspect, heat is transferred from the overhead gas stream to at least one of the rich aqueous absorbing medium or the semi-lean aqueous absorbing medium.

In a further aspect, the method further comprises the steps of introducing steam to provide heat for the desorbing step and to form a steam condensate and flashing the steam condensate to form a flashed steam and wherein heat is transferred from the flashed steam to at least one of the rich aqueous absorbing medium or the semi-lean aqueous absorbing medium.

In yet a further aspect, heat is transferred from the regenerated aqueous absorbing medium to at least one of the rich aqueous absorbing medium or the semi-lean aqueous absorbing medium.

In one aspect, the heated stream comprises a first rich aqueous absorbing medium portion and a second rich aqueous absorbing medium portion derived by delivering at least a portion of the first condensate stream to the contacting step so that at least a portion of the first condensate stream combines with the lean aqueous absorbing medium to form the rich aqueous absorbing medium which is subsequently split into the first rich aqueous medium portion and the second rich aqueous absorbing medium portion.

In another aspect, heat is transferred from the incoming gas stream to at least one of the rich aqueous absorbing medium, the first rich aqueous absorbing medium portion or the second rich absorbing medium portion.

In yet another aspect, heat is transferred from the overhead gas stream to at least one of the rich aqueous absorbing medium, the first rich aqueous absorbing medium portion or the second rich absorbing medium portion.

In a further aspect, the method further comprises the steps of introducing steam to provide heat for the desorbing step and to form a steam condensate and flashing the steam condensate to form a flashed steam and wherein heat is transferred from the flashed steam to at least one of the rich aqueous absorbing medium, the first rich aqueous absorbing medium portion or the second rich absorbing medium portion.

In yet a further aspect, heat is transferred from the regenerated aqueous absorbing medium to at least one of the rich aqueous absorbing medium, the first rich aqueous absorbing medium portion or the second rich absorbing medium portion.

In one aspect, the method further comprises the step of treating at least a portion of the lean treated gas stream to recover a second condensate stream and wherein the heated stream comprises a first mixed condensate stream portion and a second mixed condensate stream portion derived by combining at least a portion of the first condensate stream with at least a portion of the second condensate stream to form the mixed condensate stream and subsequently splitting the mixed condensate stream to form the first mixed condensate stream portion and the second mixed condensate stream portion.

In another aspect, heat is transferred from the incoming gas stream to at least one of the mixed condensate stream, the first mixed condensate stream portion or the second mixed condensate stream portion.

In yet another aspect, heat is transferred from the overhead gas stream to at least one of the mixed condensate stream, the first mixed condensate stream portion or the second mixed condensate stream portion.

In a further aspect, the method further comprises the steps of introducing steam to provide heat for the desorbing step and to form a steam condensate and flashing the steam condensate to form a flashed steam and wherein heat is transferred from the flashed steam to at least one of the mixed condensate stream, the first mixed condensate stream portion or the second mixed condensate stream portion.

In yet a further aspect, heat is transferred from the regenerated aqueous absorbing medium to at least one of the mixed condensate stream, the first mixed condensate stream portion or the second mixed condensate stream portion.

In one aspect, the method further comprises the step of recycling the regenerated aqueous absorbing medium back to the contacting step.

In another aspect, the incoming gas stream is a combustion exhaust gas.

In yet another aspect, the gaseous component is carbon dioxide.

In a further embodiment, the lean aqueous absorbing medium comprises monoethanolamine, methyldiethanolamine and a suitable solvent.

In yet a further embodiment, the molar ratio of monoethanolamine to methyldiethanolamine is between about 1.5:1 to about 4:1 and the total molarity of monoethanolamine and methyldiethanolamine is between about 3 moles/liter to about 9 moles/liter.

In one aspect, the molar ratio of monoethanolamine to methyldiethanolamine is about 2.5:1 and the total molarity of monoethanolamine and methyldiethanolamine is about 7 moles/liter.

One aspect of an aqueous absorbing medium for removing a gaseous component from an incoming gas stream described in the specification comprises monoethanolamine, methyldiethanolamine and a suitable solvent.

In another aspect, the molar ratio of monoethanolamine to methyldiethanolamine is between about 1.5:1 to about 4:1 and the total molarity of monoethanolamine and methyldiethanolamine is between about 3 moles/liter to about 9 moles/liter.

In yet another aspect, the molar ratio of monoethanolamine to methyldiethanolamine is about 2.5:1 and the total molarity of monoethanolamine and methyldiethanolamine is about 7 moles/liter.

One aspect of a method for producing an aqueous absorbing medium described in the specification comprises the steps of providing monoethanolamine, methyldiethanolamine and a suitable solvent. The method further comprises the steps of combining the monoethanolamine, the methyldiethanolamine and the solvent to form the aqueous absorbing medium.

In another aspect, the molar ratio of monoethanolamine to methyldiethanolamine is between about 1.5:1 to about 4:1 and the total molarity of monoethanolamine and methyldiethanolamine is between about 3 moles/liter to about 9 moles/liter.

In yet another aspect, the molar ratio of monoethanolamine to methyldiethanolamine is about 2.5:1 and the total molarity of monoethanolamine and methyldiethanolamine is about 7 moles/liter.

One aspect of a method for removing a gaseous component from an incoming gas stream described in the specification comprises the step of contacting the incoming gas stream with an aqueous absorbing medium comprising monoethanolamine, methyldiethanolamine and a suitable solvent.

In another aspect, the molar ratio of monoethanolamine to methyldiethanolamine is between about 1.5:1 to about 4:1 and the total molarity of monoethanolamine and methyldiethanolamine is between about 3 moles/liter to about 9 moles/liter.

In yet another aspect, the molar ratio of monoethanolamine to methyldiethanolamine is about 2.5:1 and the total molarity of monoethanolamine and methyldiethanolamine is about 7 moles/liter.

Additional features, advantages, and embodiments of one or more inventions may be set forth or apparent from consideration of the following detailed description, drawings and claims. Moreover, it is to be understood that both the foregoing introduction and the following detailed description provide examples or further explanation without limiting the scope of the invention as claimed.

DETAILED DESCRIPTION

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. It is possible that an apparatus or method described below is not an embodiment of any claimed invention. The applicants, inventors and owners reserve all rights in any invention disclosed in an apparatus or method described below that is not claimed in this document and do not abandon, disclaim or dedicate to the public any such invention by its disclosure in this document.

Figure 1:
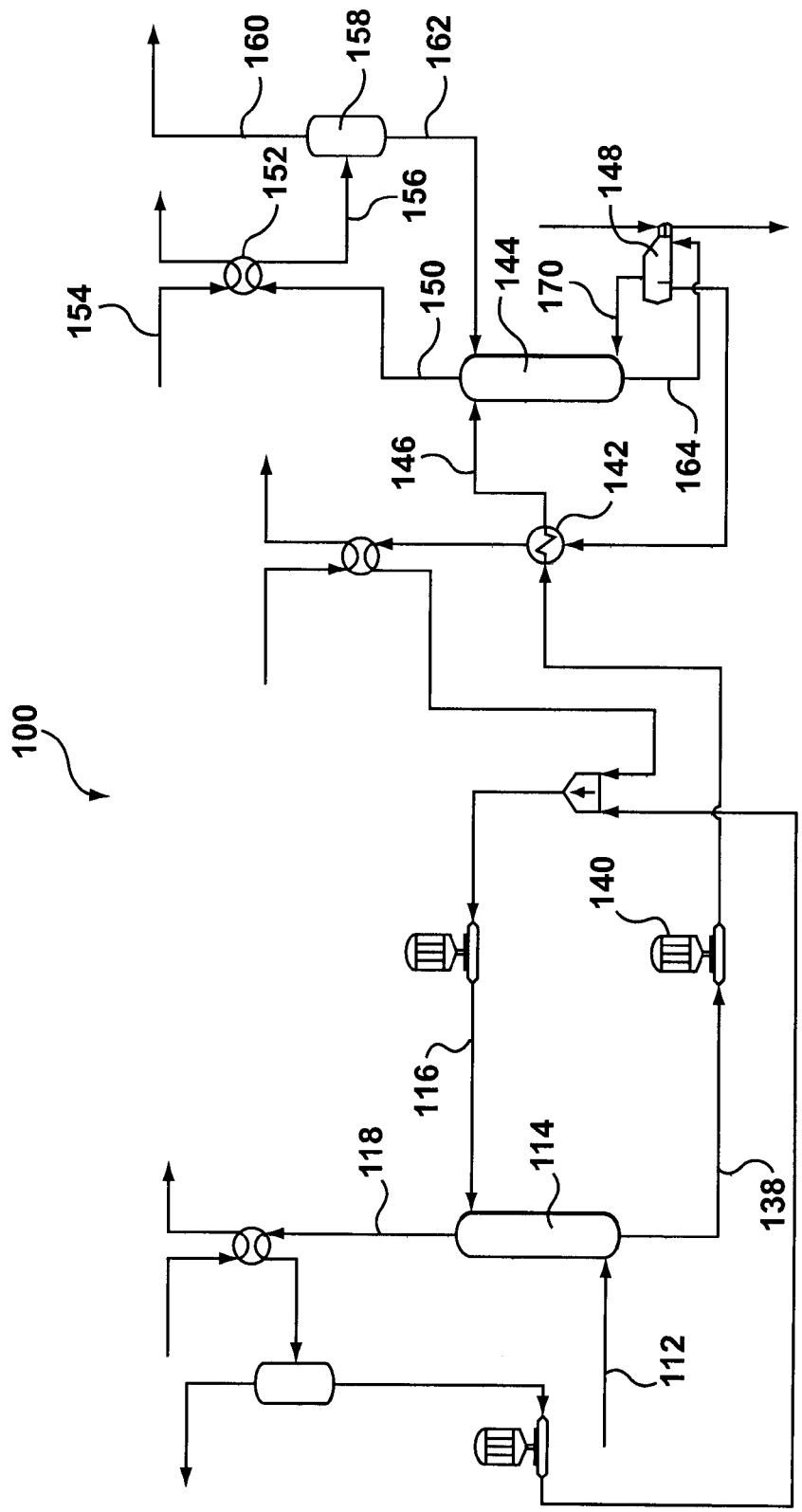
FIG. 1 is a prior art apparatus for recovering a gaseous component from an incoming gas stream.

FIG. 1 shows a prior art apparatus 100 for recovering carbon dioxide from an incoming gas stream. A carbon dioxide laden incoming gas stream in line 112 is fed to a gas-liquid contact apparatus 114 where it is contacted with a lean aqueous absorbing medium fed to the contact apparatus 114 by line 116. Carbon dioxide is absorbed from the incoming gas stream 112 to form a lean treated gas stream that exits the contact apparatus 114 by line 118. A rich aqueous absorbing medium containing dissolved carbon dioxide is removed from the contact apparatus 114 by line 138 with pump 140. The rich aqueous absorbing medium 138 can be heated in a cross heat exchanger 142 against a regenerated lean aqueous absorbing medium and is subsequently fed to a regenerator 144 by line 146. The regenerator 144 is operated at a temperature with heat provided from a steam reboiler 148 so that the carbon dioxide is desorbed from the rich aqueous absorbing medium to form an overhead gas stream that exits the regenerator 144 by line 150. A regenerated aqueous absorbing medium is removed from the regenerator 144 by line 164. The overhead gas stream 150 passes through a condenser 152 fed by cooling water 154 to condense liquid from the overhead gas stream 150. An overhead gas stream containing the condensed liquid in line 156 is delivered to a flash drum 158 to separate a carbon dioxide rich product gas stream in line 160 from a condensate stream in line 162. The condensate stream in line 162 is recycled back to the regenerator 144.

Still referring to FIG. 1, heat from the steam reboiler 148 is used to operate the regenerator 144 at a relatively high temperature ranging from between about 80° C. to about 160° C. However, the condensate stream 162 is at a temperature between about 30° C. to about 40° C. The introduction of this relatively cool condensate stream 162 back into the regenerator 144 lowers the operating temperature of the regenerator 144. Accordingly, additional heat is required to raise the temperature back up to the optimal operating range to efficiently desorb carbon dioxide from the rich aqueous absorbing medium.

In one aspect of a method described in the specification, the inventors have attempted to reduce the heat duty of the regenerator (i.e. the amount of the external steam required to operate the regenerator). Accordingly, unlike in the conventional apparatus and method described above, at least a portion of the condensate stream recovered from the overhead gas stream is used to form a heated stream that is subsequently recycled back to the regenerator. In one aspect, heat already contained within the apparatus is transferred to the heated stream before being recycled back to the regenerator.

For consistency, the apparatuses and methods described in detail below in FIGS. 2-26 make reference to the recovery of carbon dioxide ($CO_2$) from an incoming gas stream. However, it is understood that the apparatuses and methods described in detail below can also be used to recover other types of gaseous components from incoming gas streams, including, but not limited to, hydrogen sulfide ($H_2S$), sulfur dioxide ($SO_2$), chlorine ($Cl_2$), and ammonia ($NH_3$). Furthermore, the specific aqueous absorbing medium compositions described in detail below can be used for the recovery of carbon dioxide and/or hydrogen sulfide.

It is to be appreciated that the source, composition, and other parameters of the incoming gas may vary considerably and will depend on the particular source. The types of incoming gas streams that can be treated, can include, but are not limited to, flue gas streams from power plants such as coal-fired power plants, natural gas combined cycles, natural gas boilers, natural gas, gas streams from gasification plants, gas from cement manufacturing, reformate gas, synthesis gas, refinery off-gas, biogas and air (e.g., in a space application). If required, the incoming gas stream can be pretreated prior to entering the apparatus (e.g., fractionation, filtration, scrubbing to remove particulates and other gaseous components, and combination or dilution with other gases). Accordingly, the chemical composition may also vary considerably. Suitable incoming gas streams typically contain between about 0.03 to about 80% by volume carbon dioxide, specifically between about 1 to about 33% by volume carbon dioxide, and more specifically between about 3 to about 15% by volume carbon dioxide.

With respect to the gas-liquid contact apparatus, it is understood that the particular type of absorber will depend in part on the specific composition, flow rate, pressure and/or temperature of the incoming gas stream. However, any form of absorber may be employed consistent with the aim of efficiently removing carbon dioxide from the incoming gas stream and being absorbed into the aqueous absorbing medium. The absorber is essentially a counter-current column with a circular or rectangular cross-section, and with a suitable height and cross-sectional area sufficient to effect the removal of carbon dioxide to a specified clean-up target. The column internals could be in the form of structured or random packing providing adequate number of stages to meet the clean-up target, or plates (valve, sieve, or bubble cap) with an adequate number of plates to meet the clean-up target. The top of the absorber column can also include a demister or off-gas scrubber section which is used for the purpose of recovering the absorbing medium entrained in water vapors from the absorber section and to cool the off-gas at a temperature to help maintain a water balance across the plant. The absorber column itself can contain a number of sections each separated by a chimney tray that allows gas to pass up through to the next section but ensures liquid separation to entrain water droplets from the exiting lean gas.

With respect to the regenerator, any type of stripper may be employed consistent with the aim of efficiently desorbing at least a portion of the carbon dioxide from the rich aqueous absorbing medium. The stripper is typically a column with a circular cross-section, and with a suitable height and cross-sectional area sufficient to effect the stripping of carbon dioxide to provide a lean absorbing medium using an externally supplied source of heat. For example, a reboiler can be connected to the bottom part of the stripping column to provide the heat supply in the form of steam. The column internals can be in the form of structured or random packing providing an adequate number of stages to meet the stripping function, or plates (valve, sieve or bubble cap) with number of plates to meet the same stripping function.

Figure 2:
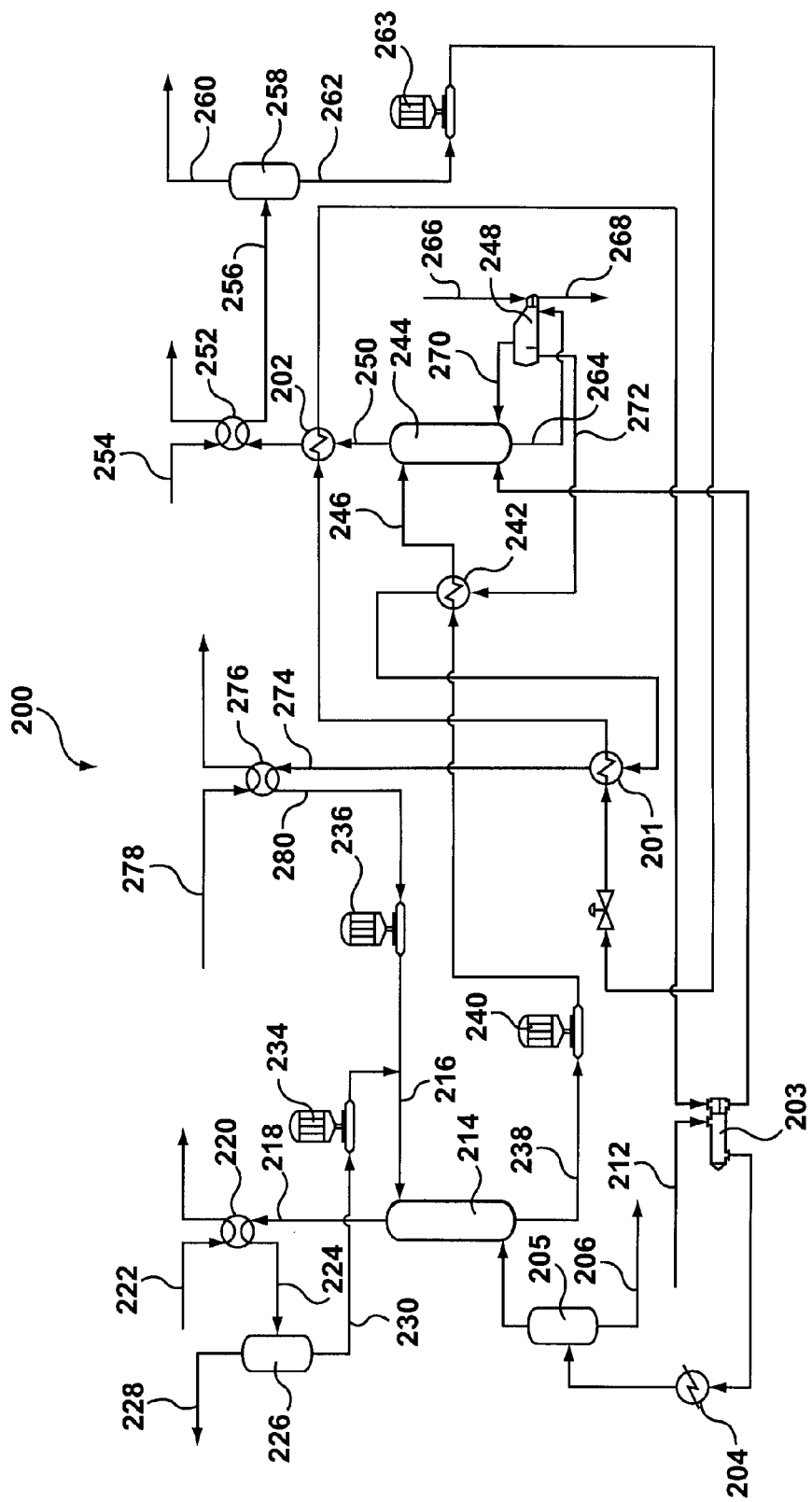
FIG. 2 is an apparatus for recovering a gaseous component from an incoming gas stream according to a first embodiment described in the specification.

FIG. 2 shows an apparatus 200 for recovering carbon dioxide from an incoming gas stream according to a first embodiment described in the specification. In this embodiment, the heated stream comprises the condensate stream recovered from the overhead gas stream. In this embodiment, heat from the incoming gas stream, the regenerated aqueous absorbing medium, and the overhead gas stream is transferred to the heated stream before being recycled back to the regenerator. However, it is to be appreciated that it is sufficient to transfer heat from at least one of the streams in the apparatus to the heated stream before being recycled back to the regenerator.

A carbon dioxide laden incoming gas stream in line 212 can be cooled in a heat exchanger 203 against the condensate stream recovered from the overhead gas stream which will be described in more detail below. Moreover, if required, the incoming gas stream can be fed to a cooler 204 to further reduce the temperature of the incoming gas stream to an acceptable level and can be subsequently fed to a flash drum 205 to remove excess moisture in line 206 before entering a gas-liquid contact apparatus 214. The cooled incoming gas stream is fed to the gas-liquid contact apparatus 214 where it is contacted with a lean aqueous absorbing medium fed to the contact apparatus 214 by line 216. Carbon dioxide is absorbed from the incoming gas stream to form a lean treated gas stream that exits the contact apparatus 214 by line 218. The lean treated gas stream 218 passes through a cooler 220 fed by cooling water 222 to condense liquid from the lean treated gas stream 218. A lean treated gas stream containing the condensed liquid in line 224 is delivered to a flash drum 226 to separate a water-depleted lean treated gas stream in line 228 from a condensate stream in line 230. The condensate stream in line 230 is ultimately recycled back to the contact apparatus 214 via pump 234. The water-depleted lean treated gas stream in line 228 may be processed further, if desired, before venting via a chimney, flare stack, or the like.

A rich aqueous absorbing medium containing dissolved carbon dioxide is removed from the contact apparatus 214 by line 238 with pump 240. The rich aqueous absorbing medium can be heated in a cross heat exchanger 242 against a regenerated lean aqueous absorbing medium and is subsequently fed to a regenerator 244 by line 246. The regenerator 244 is operated at a temperature with heat provided from a steam reboiler 248 so that the carbon dioxide is desorbed from the rich aqueous absorbing medium to form an overhead gas stream that exits the regenerator 244 by line 250. The overhead gas stream 250 is cooled in a heat exchanger 202 and is subsequently fed to a condenser 252. The condenser 252 is fed by cooling water 254 to condense liquid from the overhead gas stream 250. An overhead gas stream containing the condensed liquid in line 256 is delivered to a flash drum 258 to separate a carbon dioxide rich product gas stream in line 260 from a condensate stream in line 262. The condensate stream in line 262 is removed with pump 263 and is delivered to a heat exchanger 201 where it is heated against the regenerated lean aqueous absorbing medium. The condensate stream is delivered to a heat exchanger 202 where it is heated against the overhead gas stream in line 250. The condensate stream is delivered to a heat exchanger 203 where it is heated against the incoming gas stream in line 212 and is subsequently recycled back to the regenerator 244.

A regenerated lean aqueous absorbing medium is removed from the regenerator 244 in line 264 and is fed to the steam reboiler 248. Steam is fed to the steam reboiler in line 266 and is removed in the form of a steam condensate in line 268. Heat from the steam is transferred to the regenerated lean aqueous absorbing medium to form a vapor stream which is recycled back to the regenerator 244 in line 270 and a regenerated lean aqueous absorbing medium which exits the steam reboiler 248 in line 272. It is to be appreciated that the regenerated lean aqueous absorbing medium in line 272 has a lower carbon dioxide loading than the regenerated lean aqueous absorbing medium in line 264. The regenerated lean aqueous absorbing medium is delivered to heat exchanger 242 by line 272 where it is cooled by the rich aqueous absorbing medium in line 238. The regenerated lean aqueous absorbing medium is delivered to heat exchanger 201 where it is cooled by the condensate stream in line 262. If required, the regenerated aqueous absorbing medium in line 274 can be delivered to a cooler 276 fed by cooling water 278 to reduce the temperature of the regenerated aqueous absorbing medium to a level that is acceptable for the contact apparatus 214. The regenerated aqueous absorbing medium is removed from the cooler 276 in line 280 by pump 236 and is mixed with the condensate stream in 230. The regenerated aqueous absorbing medium is ultimately recycled back to the contact apparatus 214 in line 216.

FIGS. 3-7 show apparatuses for recovering carbon dioxide from an incoming gas stream according to further embodiments described in the specification. In these embodiments, the heated stream comprises the rich aqueous absorbing medium derived by delivering at least a portion of the condensate stream recovered from the overhead gas stream to the contact apparatus so that at least a portion of the condensate stream combines with the lean aqueous absorbing medium to form the rich aqueous absorbing medium. As will be explained in more detail below, heat from at least one of the incoming gas stream, the overhead gas stream, the regenerated aqueous absorbing medium, or flashed steam derived from flashing a steam condensate can be transferred to the heated stream before being delivered to the regenerator.

Figure 3:
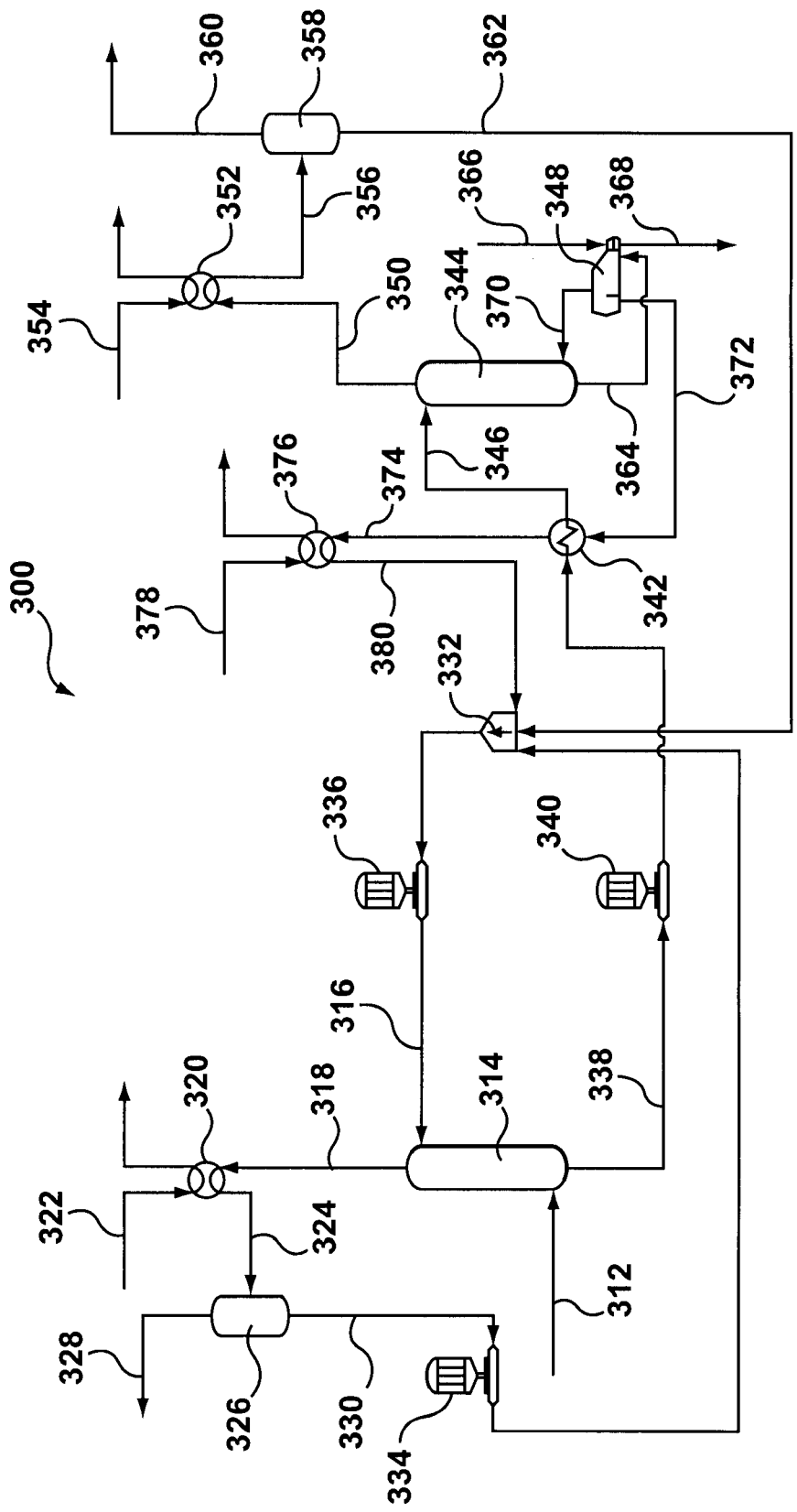
FIG. 3 is an apparatus for recovering a gaseous component from an incoming gas stream according to a second embodiment described in the specification.

FIG. 3 shows an apparatus 300 for recovering carbon dioxide from an incoming gas stream according to a second embodiment described in the specification. A carbon dioxide laden incoming gas stream in line 312 is fed to a gas-liquid contact apparatus 314 where it is contacted with a lean aqueous absorbing medium fed to the contact apparatus 314 by line 316. If required, the incoming gas stream can be pretreated (not shown) to reduce the temperature and remove excess moisture before entering the contact apparatus 314. Carbon dioxide is absorbed from the incoming gas stream 312 to form a lean treated gas stream that exits the contact apparatus 314 by line 318. The lean treated gas stream 318 passes through a cooler 320 fed by cooling water 322 to condense liquid from the lean treated gas stream 318. A lean treated gas stream containing the condensed liquid in line 324 is delivered to a flash drum 326 to separate a water-depleted lean treated gas stream in line 328 from a condensate stream in line 330. The condensate stream in line 330 is delivered to a mixer 332 with pump 334 and is ultimately recycled back to the contact apparatus 314 with pump 336 in line 316. The water-depleted lean treated gas stream in line 328 may be processed further, if desired, before venting via a chimney, flare stack, or the like.

A rich aqueous absorbing medium containing dissolved carbon dioxide is removed from the contact apparatus 314 by line 338 with pump 340. The rich aqueous absorbing medium 338 is heated in a cross heat exchanger 342 against a regenerated aqueous absorbing medium and is subsequently fed to a regenerator 344 by line 346. The regenerator 344 is operated at a temperature with heat provided from a steam reboiler 348 so that the carbon dioxide is desorbed from the rich aqueous absorbing medium to form an overhead gas stream that exits the regenerator 344 by line 350. The overhead gas stream 350 passes through a condenser 352 fed by cooling water 354 to condense liquid from the overhead gas stream 350. An overhead gas stream containing the condensed liquid in line 356 is delivered to a flash drum 358 to separate a carbon dioxide rich product gas stream in line 360 from a condensate stream in line 362. The condensate stream 362 is delivered to a mixer 332 and is ultimately fed to the contact apparatus 314 with pump 336 in line 316. At least a portion of the condensate stream recovered from the overhead gas stream in line 362 combines with the lean aqueous absorbing medium and fed to the contact apparatus 314 to form the rich aqueous absorbing medium.

A regenerated lean aqueous absorbing medium is removed from the regenerator 344 in line 364 and is fed to the steam reboiler 348. Steam is fed to the steam reboiler in line 366 and is removed in the form of a steam condensate in line 368. Heat from the steam is transferred to the regenerated lean aqueous absorbing medium to form a vapor stream which is recycled back to the regenerator 348 in line 370 and a regenerated lean aqueous absorbing medium which exits the steam reboiler 348 in line 372. The regenerated lean aqueous absorbing medium is delivered to heat exchanger 342 by line 372 where it is cooled by the rich aqueous absorbing medium in line 338.

If required, the regenerated aqueous absorbing medium in line 374 can be delivered to a cooler 376 fed by cooling water 378 to reduce the temperature of the regenerated aqueous absorbing medium to a level that is acceptable for the contact apparatus 314. The regenerated aqueous absorbing medium is removed from the cooler 376 in line 380 and is delivered to a mixer 332 where it is mixed with the condensate stream in line 330 and the condensate stream in line 362. The regenerated aqueous absorbing medium is ultimately recycled back to the contact apparatus 314 in line 316.

Figure 4:
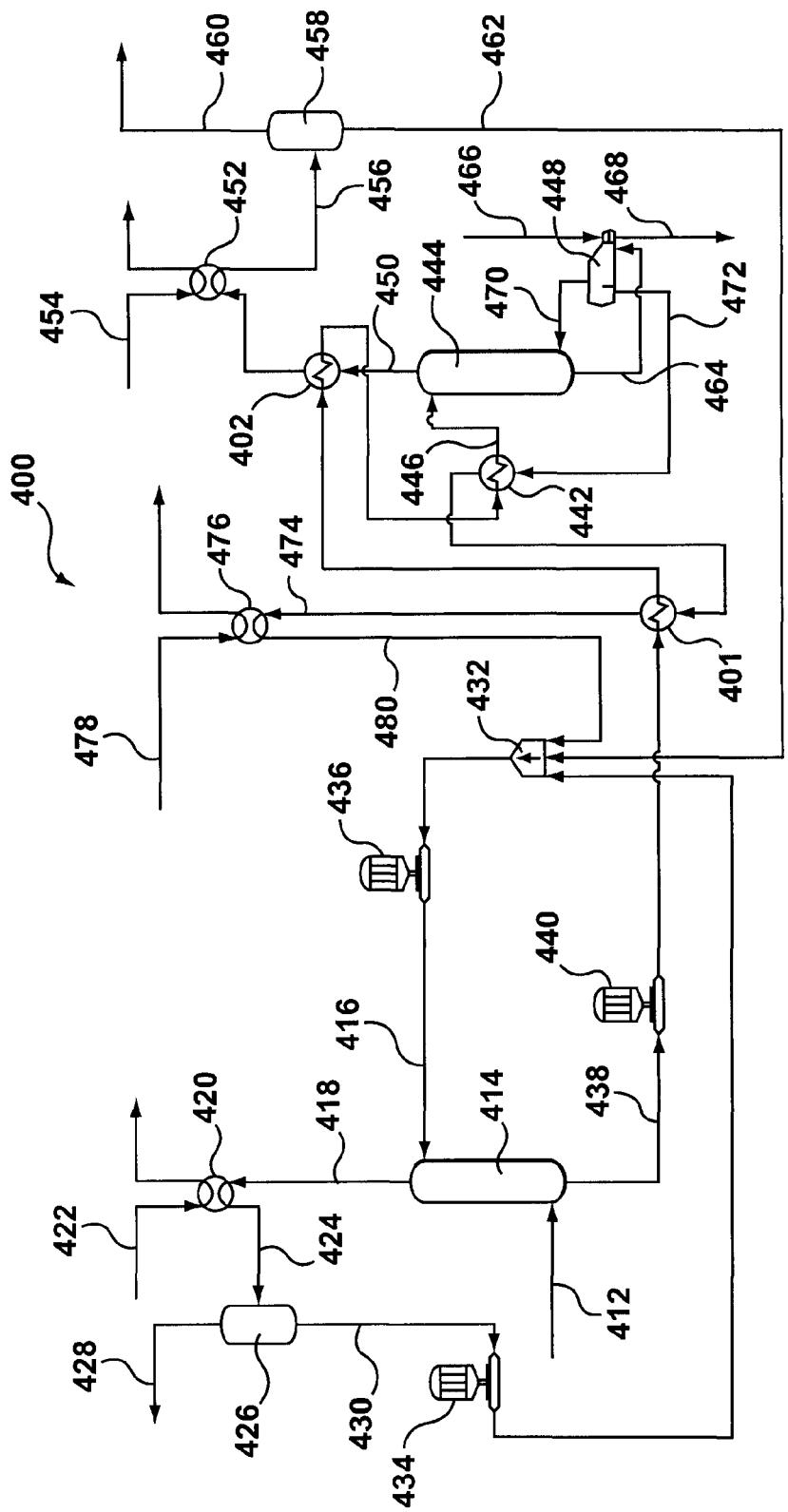
FIG. 4 is an apparatus for recovering a gaseous component from an incoming gas stream according to a third embodiment described in the specification.

FIG. 4 shows an apparatus 400 for recovering carbon dioxide from an incoming gas stream according to a third embodiment described in the specification. The third embodiment is the same as the second embodiment, except as described in detail below.

In this embodiment, there are two additional heat exchangers 401, 402 to transfer more heat to the rich aqueous absorbing medium before entering the regenerator.

A rich aqueous absorbing medium containing dissolved carbon dioxide is removed from the contact apparatus 414 by line 438 with pump 440. The rich aqueous absorbing medium is delivered to a heat exchanger 401 where it is heated against the regenerated lean aqueous absorbing medium. The rich aqueous absorbing medium is delivered to a heat exchanger 402 where it is heated against the overhead gas stream in line 450. The rich aqueous absorbing medium is delivered to a heat exchanger 442 where it is further heated against the regenerated aqueous lean absorbing medium and is subsequently fed into the regenerator 444 by line 446.

Figure 5:
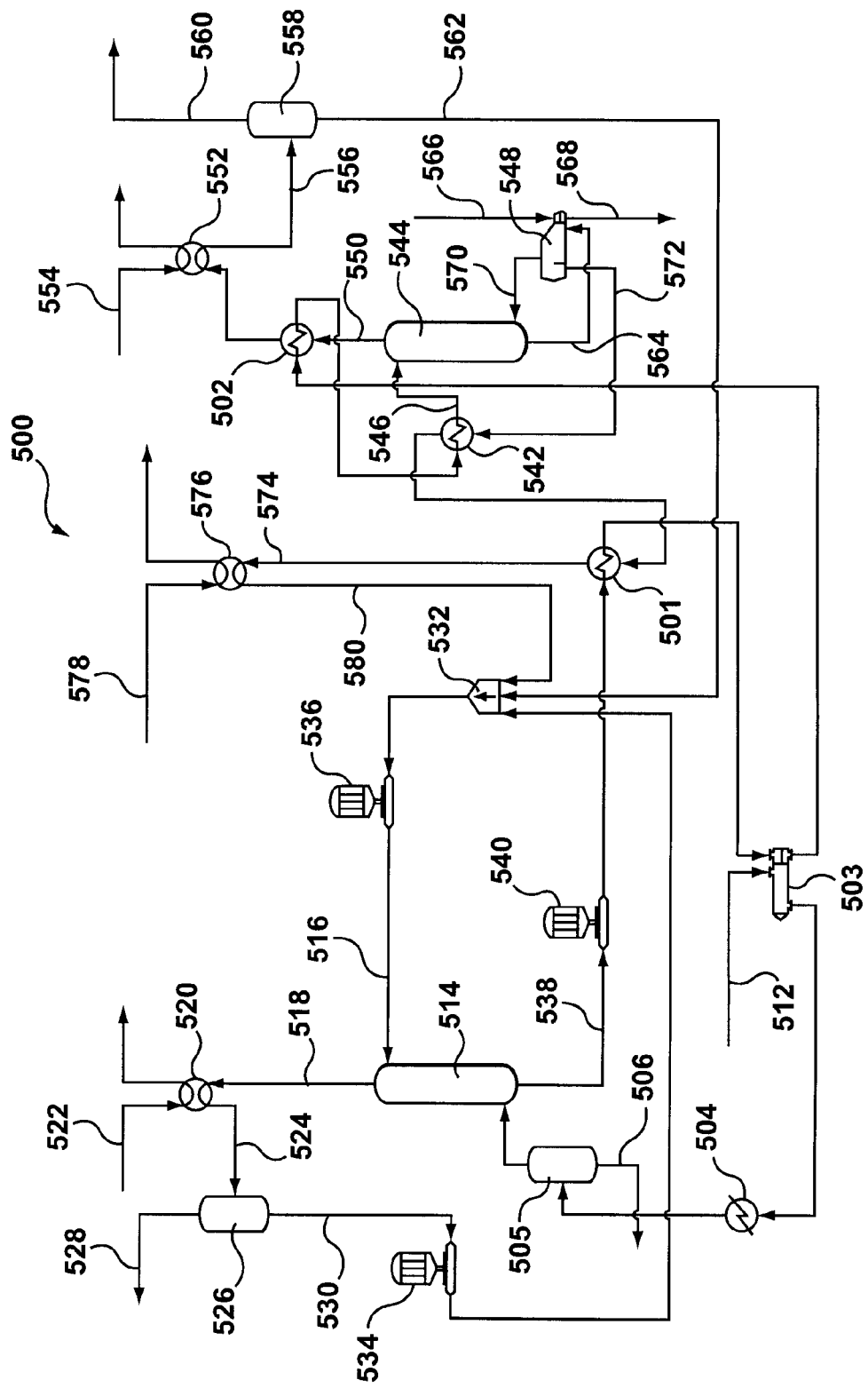
FIG. 5 is an apparatus for recovering a gaseous component from an incoming gas stream according to a fourth embodiment described in the specification.

FIG. 5 shows an apparatus 500 for recovering carbon dioxide from an incoming gas stream according to a fourth embodiment described in the specification. The fourth embodiment is the same as the third embodiment, except as described in detail below.

In the fourth embodiment, there is an additional heat exchanger 503 to transfer more heat to the rich aqueous absorbing medium before entering the regenerator. If required, the apparatus can also include a cooler 504 to further cool down the incoming gas stream and a flash drum 505 to separate out the excess moisture in line 506 from the incoming gas stream before entering the contact apparatus 514.

A rich aqueous absorbing medium containing dissolved carbon dioxide is removed from the contact apparatus 514 by line 538 with pump 540. The rich aqueous absorbing medium 538 is delivered to a heat exchanger 501 where it is heated against the regenerated lean aqueous absorbing medium. The rich aqueous absorbing medium is delivered to a heat exchanger 503 where it is heated against the incoming gas stream. The rich aqueous absorbing medium is delivered to a heat exchanger 502 where it is heated against the overhead gas stream. The rich aqueous absorbing medium is delivered to a heat exchanger 542 where it is further heated against the regenerated aqueous lean absorbing medium and is subsequently fed into the regenerator 544 by line 546.

Figure 6:
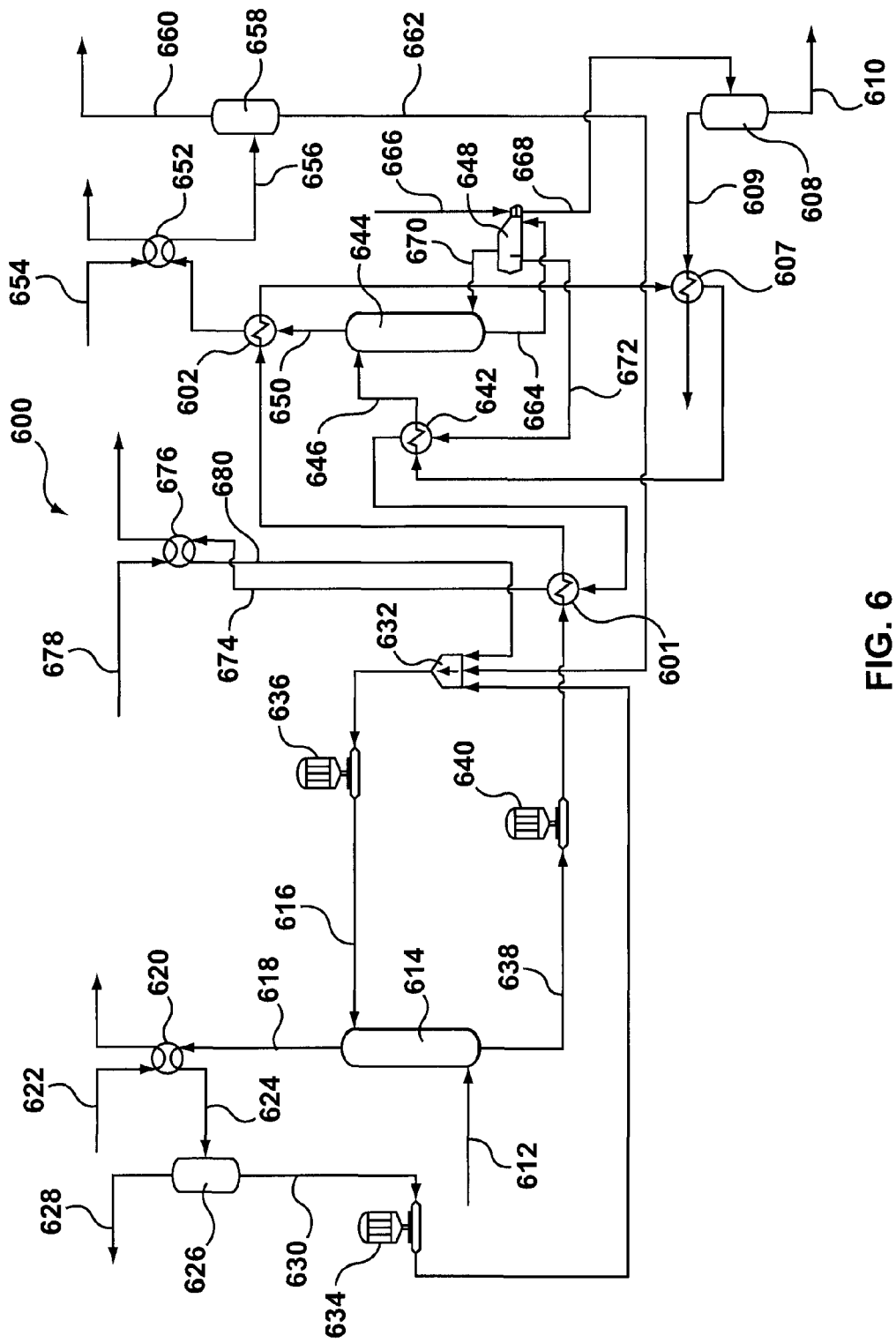
FIG. 6 is an apparatus for recovering a gaseous component from an incoming gas stream according to a fifth embodiment described in the specification.

FIG. 6 shows an apparatus 600 for recovering carbon dioxide from an incoming gas stream according to a fifth embodiment described in the specification. The fifth embodiment is the same as the third embodiment, except as described in detail below.

In this embodiment, there is an additional heat exchanger 607 to transfer more heat to the rich aqueous absorbing medium before entering the regenerator and a flash drum 608 for flashing the steam condensate exiting the reboiler to form a flashed steam.

A rich aqueous absorbing medium containing dissolved carbon dioxide is removed from the contact apparatus 614 by line 638 with pump 640. The rich aqueous absorbing medium is delivered to a heat exchanger 601 where it is heated against the regenerated lean aqueous absorbing medium. The rich aqueous absorbing medium is delivered to a heat exchanger 602 where it is heated against the overhead gas stream. Steam condensate is removed from the steam reboiler 648 in line 668 and is fed to a flash drum 608 that separates the flashed steam in line 609 from the flashed steam condensate in line 610. The rich aqueous absorbing medium is delivered to a heat exchanger 607 where it is further heated against the flashed steam in line 609. The rich aqueous absorbing medium is delivered to a heat exchanger 642 where it is further heated against the regenerated lean aqueous absorbing medium and is subsequently fed into the regenerator 644 by line 646.

Figure 7:
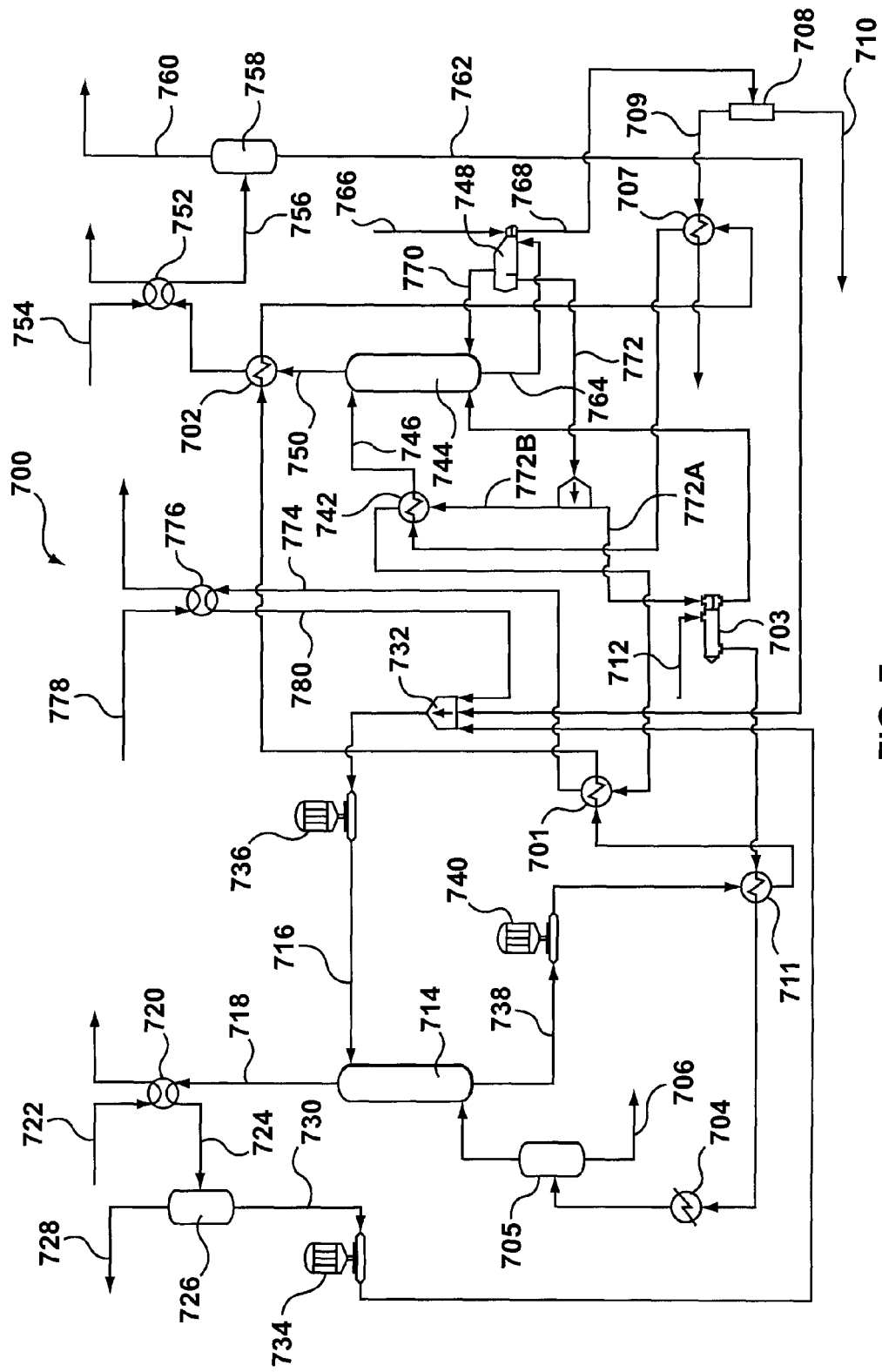
FIG. 7 is an apparatus for recovering a gaseous component from an incoming gas stream according to a sixth embodiment described in the specification.

FIG. 7 shows an apparatus 700 for recovering carbon dioxide from an incoming gas stream according to a sixth embodiment described in the specification. The sixth embodiment is the same as the fifth embodiment, except as described in detail below.

In this embodiment, there is an additional heat exchanger 711 to transfer more heat to the rich aqueous absorbing medium before entering the regenerator, the regenerated lean aqueous absorbing medium is split into two portions 772A, 772B, and there is an additional heat exchanger 703 to transfer more heat to a portion of the regenerated lean aqueous absorbing medium 772A before entering the regenerator. In essence, the heat exchanger 703 acts as an additional reboiler supplementing the existing steam reboiler 748. If required, the apparatus can also include a cooler 704 to further cool down the incoming gas stream and a flash drum 705 to separate out the excess moisture in line 706 from the incoming gas stream before entering the contact apparatus 714.

A rich aqueous absorbing medium containing dissolved carbon dioxide is removed from the contact apparatus 714 by line 738 with pump 740. The rich aqueous absorbing medium is delivered to a heat exchanger 711 where it is heated against the incoming gas stream. The rich aqueous absorbing medium is delivered to a heat exchanger 701 where it is heated against a portion of the regenerated lean aqueous absorbing medium 772B. The rich aqueous absorbing medium is delivered to a heat exchanger 702 where it is heated against the overhead gas stream. Steam condensate is removed from the steam reboiler 748 in line 768 and is fed to a flash drum 708 that separates the flashed steam in line 709 from the flashed steam condensate in line 710. The rich aqueous absorbing medium is delivered to a heat exchanger 707 where it is further heated against the flashed steam in line 709. The rich aqueous absorbing medium is delivered to a heat exchanger 742 where it is further heated against a portion of the regenerated lean aqueous absorbing medium 772B and is subsequently fed into the regenerator 744 by line 746.

A regenerated lean aqueous absorbing medium is removed from the regenerator 744 in line 764 and is fed to the steam reboiler 748. Steam is fed to the steam reboiler in line 766 and is removed in the form of a steam condensate in line 768. Heat from the steam is transferred to the regenerated lean aqueous absorbing medium to form a vapor stream which is recycled back to the regenerator 748 in line 770 and a regenerated lean aqueous absorbing medium which exits the steam reboiler 748 in line 772. The regenerated lean aqueous absorbing medium is split into two portions 772A, 772B. The portion of regenerated lean aqueous absorbing medium 772A is delivered to a heat exchanger 703 where it is heated against the incoming gas stream and is subsequently fed into the regenerator 748. The portion of the regenerated lean aqueous absorbing medium 772B is delivered to a heat exchanger 742 where it is cooled by the rich aqueous absorbing medium. The portion of regenerated aqueous absorbing medium 772B is delivered to a heat exchanger 701 where it is further cooled by the rich aqueous absorbing medium. If required, the portion of regenerated aqueous absorbing medium 772B can be delivered to a cooler 776 fed by cooling water 778 to reduce the temperature of the regenerated aqueous absorbing medium to a level that is acceptable for the contact apparatus 714. The regenerated aqueous absorbing medium is removed from the cooler 776 and is delivered to a mixer 732 where it is mixed with the condensate stream in line 730 and the condensate stream 762. The portion of the regenerated aqueous absorbing medium 772B is ultimately recycled back to the contact apparatus 714 in line 716.

Figure 8:
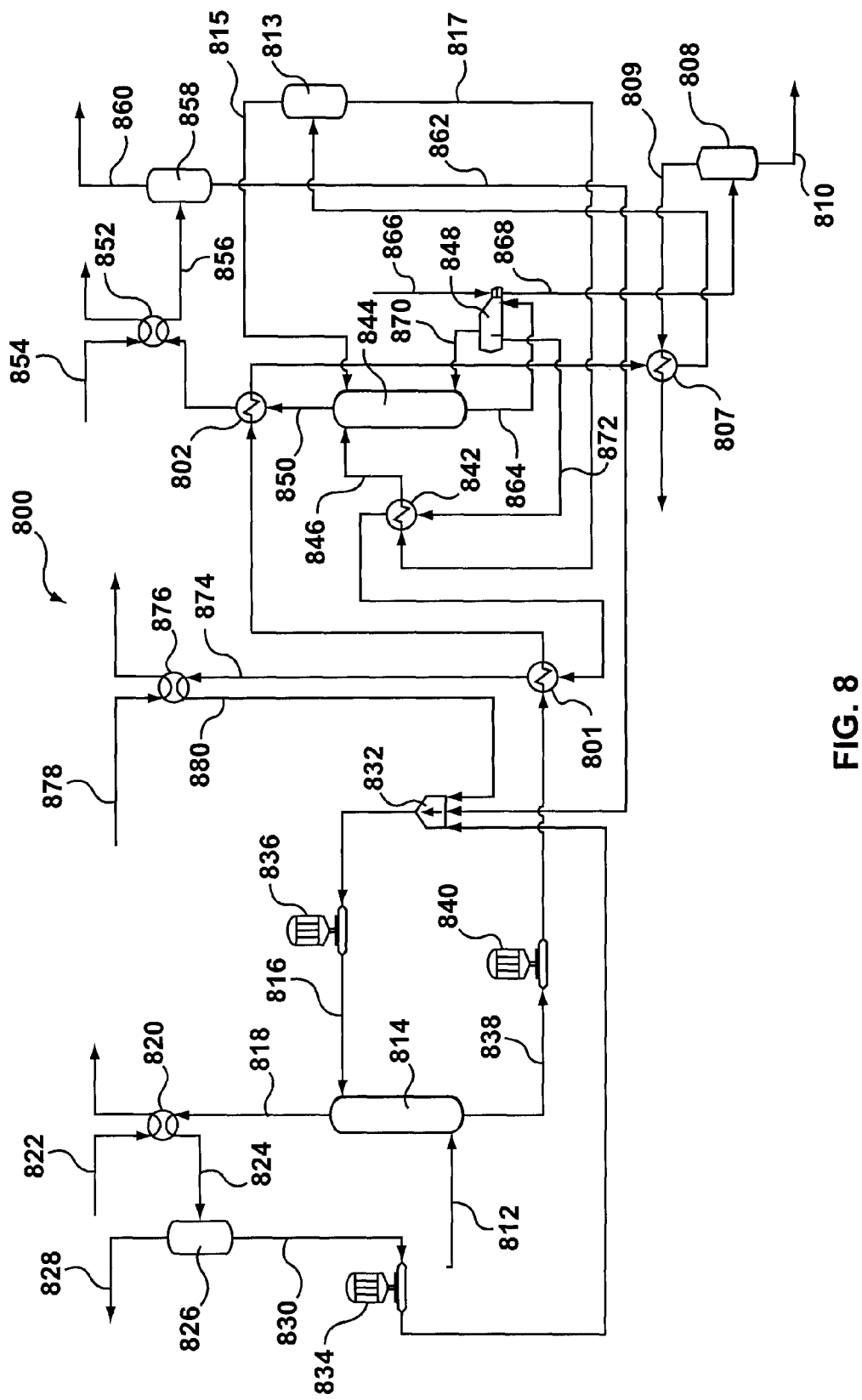
FIG. 8 is an apparatus for recovering a gaseous component from an incoming gas stream according to a seventh embodiment described in the specification.

FIG. 8 shows an apparatus 800 for recovering carbon dioxide from an incoming gas stream according to a seventh embodiment described in the specification. The seventh embodiment is the same as the fifth embodiment, except as described in detail below.

In this embodiment, the heated stream comprises a rich vapor stream and a semi-lean aqueous absorbing medium derived by delivering at least a portion of the condensate stream recovered from the overhead gas stream to the contacting apparatus so that at least a portion of the condensate stream combines with the lean aqueous absorbing medium to form the rich aqueous absorbing medium which is subsequently flashed to form the rich vapor stream and the semi-lean aqueous absorbing medium. In this embodiment, heat from the regenerated aqueous absorbing medium, the overhead gas stream and flashed steam derived from flashing a steam condensate is transferred to the rich aqueous absorbing medium before being flashed to form the rich vapor stream and the semi-lean aqueous absorbing medium. Additionally, heat from the regenerated aqueous absorbing medium is transferred to the semi-lean absorbing medium before entering the regenerator.

A rich aqueous absorbing medium containing dissolved carbon dioxide is removed from the contact apparatus 814 by line 838 with pump 840. The rich aqueous absorbing medium is delivered to a heat exchanger 801 where it is heated against the regenerated lean aqueous absorbing medium. The rich aqueous absorbing medium is delivered to a heat exchanger 802 where it is heated against the overhead gas stream. Steam condensate is removed from the steam reboiler 848 in line 868 and is fed to a flash drum 808 that separates the flashed steam in line 809 from the flashed steam condensate in line 810. The rich aqueous absorbing medium is delivered to a heat exchanger 807 where it is further heated against the flashed steam in line 809. The rich aqueous absorbing medium is delivered to a flash drum 813 where it is separated into a rich vapor stream which is fed back into the regenerator 844 in line 815 and a semi-lean aqueous absorbing medium that is delivered to a heat exchanger 842 in line 817 where it is heated against the regenerated lean aqueous absorbing medium and is subsequently fed back to the regenerator 844.

FIGS. 9-12 show apparatuses for recovering carbon dioxide from an incoming gas stream according to further embodiments described in the specification. In these embodiments, the heated stream comprises a first rich aqueous absorbing medium portion and a second rich aqueous absorbing medium portion derived by delivering at least a portion of the condensate stream recovered from the overhead gas stream to the contact apparatus so that at least a portion of the condensate stream combines with the lean aqueous absorbing medium to form the rich aqueous absorbing medium which is subsequently split into the first rich aqueous medium portion and the second rich aqueous absorbing medium portion. As will be explained in more detail below, heat from at least one of the incoming gas stream, the overhead gas stream, the regenerated aqueous absorbing medium, or flashed steam derived from flashing a steam condensate is transferred to at least one of the rich aqueous absorbing medium before being split into two portions, the first rich aqueous absorbing medium portion or the second rich aqueous medium portion before being delivered to the regenerator.

Figure 9:
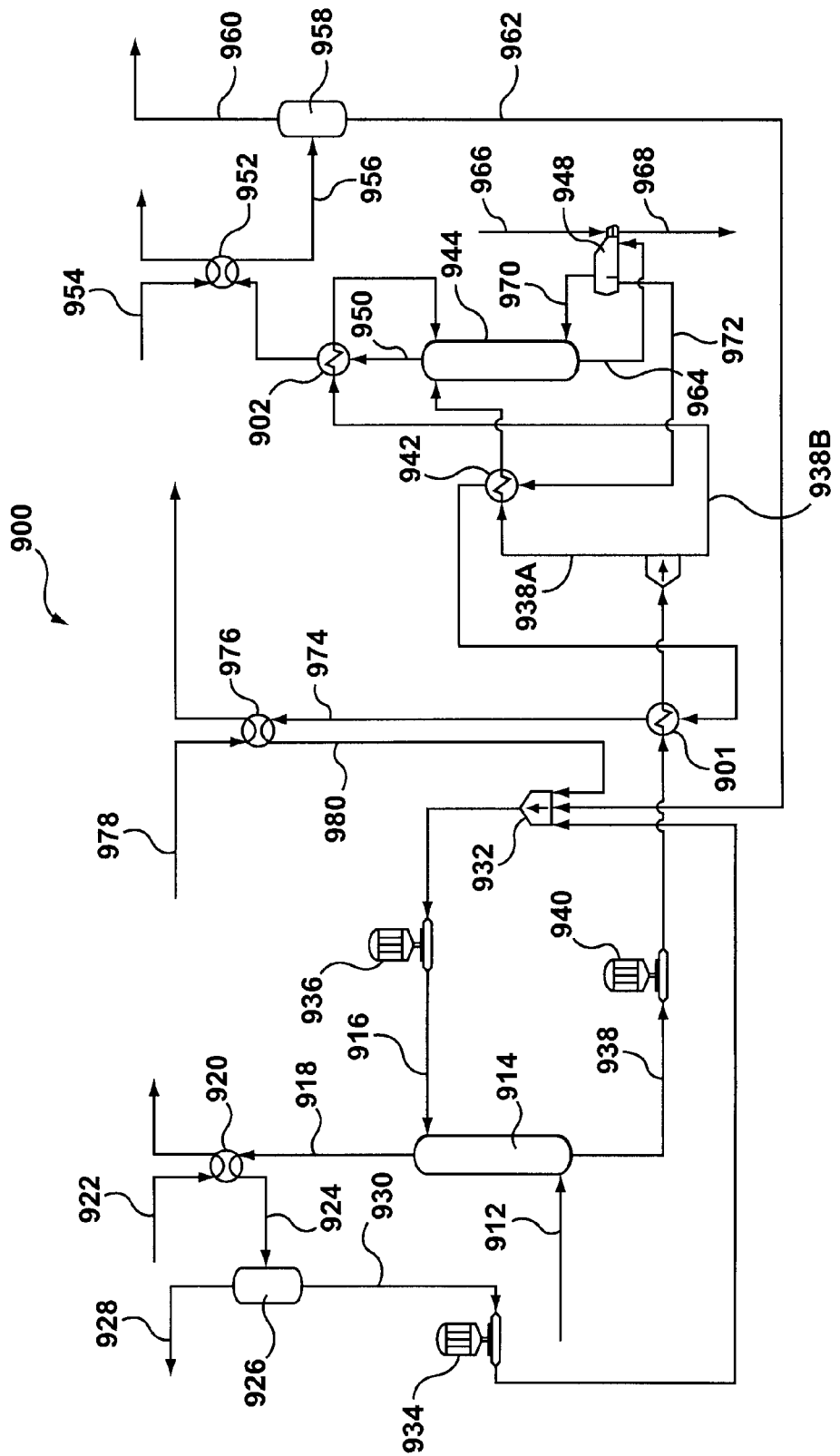
FIG. 9 is an apparatus for recovering a gaseous component from an incoming gas stream according to an eighth embodiment described in the specification.

FIG. 9 shows an apparatus 900 for recovering carbon dioxide from an incoming gas stream according to an eighth embodiment described in the specification. The eighth embodiment is the same as the third embodiment, except as described in detail below.

In this embodiment, the rich aqueous absorbing medium is split immediately downstream of heat exchanger 901 into two portions 938A, 938B.

A rich aqueous absorbing medium containing dissolved carbon dioxide is removed from the contact apparatus 914 by line 938 with pump 940. The rich aqueous absorbing medium is delivered to a heat exchanger 901 where it is heated against the regenerated lean aqueous absorbing medium. The rich aqueous absorbing medium is then split into two portions 938A, 938B. In one aspect, about 74% by volume can be diverted to portion 938A and about 26% by volume can be diverted to portion 938B. The portion of rich aqueous absorbing medium 938A is delivered to a heat exchanger 942 where it is further heated against the regenerated aqueous lean absorbing medium and is subsequently fed into the regenerator 944. The portion of the rich aqueous absorbing medium 938B is delivered to a heat exchanger 902 where it is heated against the overhead gas stream and is subsequently fed into the regenerator 944.

Figure 10:
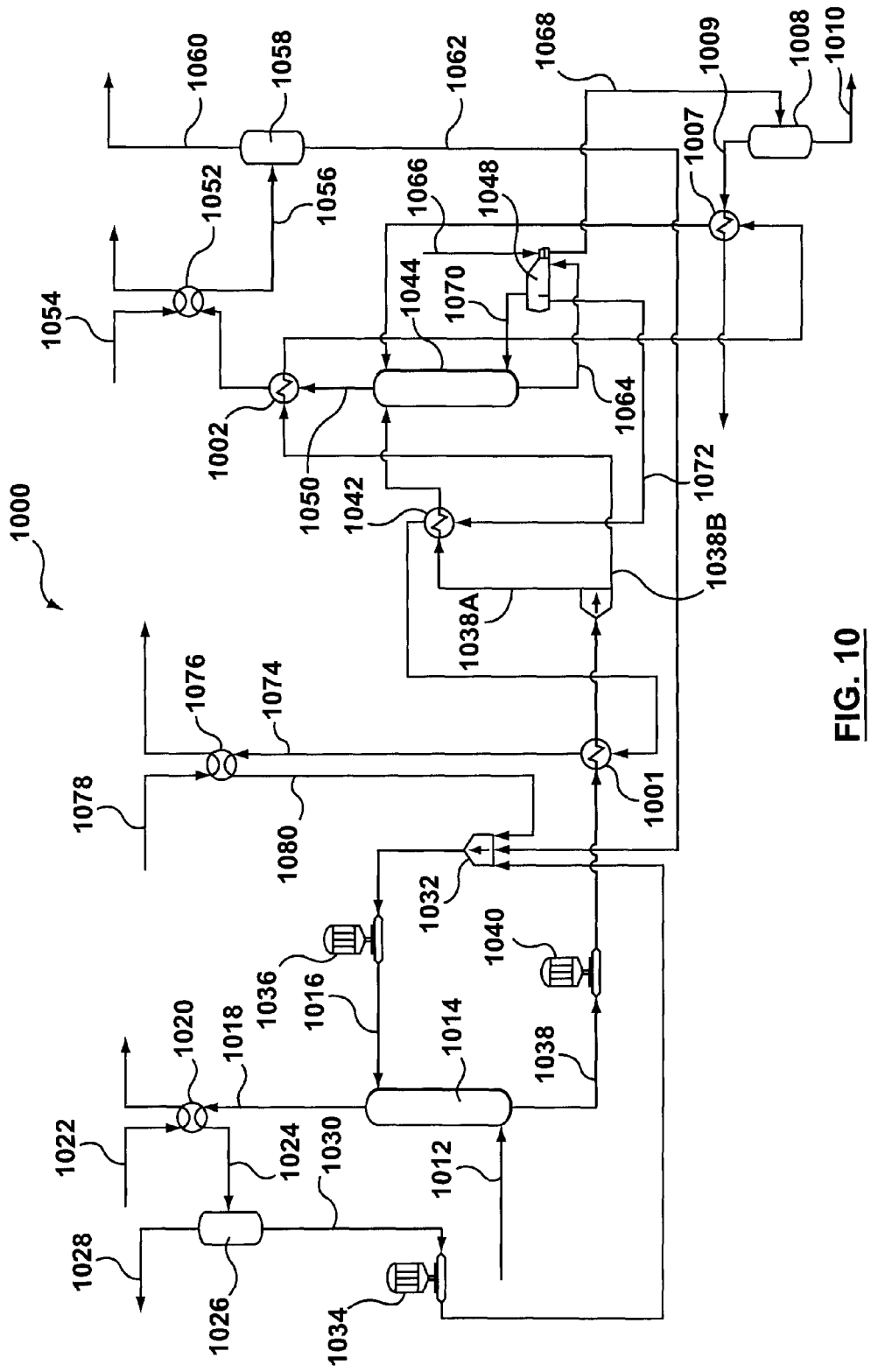
FIG. 10 is an apparatus for recovering a gaseous component from an incoming gas stream according to a ninth embodiment described in the specification.

FIG. 10 shows an apparatus 1000 for recovering carbon dioxide from an incoming gas stream according to a ninth embodiment described in the specification. The ninth embodiment is the same as the eighth embodiment, except as described in detail below.

In this embodiment, there is an additional heat exchanger 1007 to transfer more heat to a portion of the rich aqueous absorbing medium 1038B before entering the regenerator and a flash drum 1008 to form flashed steam from the steam condensate exiting the reboiler.

A rich aqueous absorbing medium containing dissolved carbon dioxide is removed from the contact apparatus 1014 by line 1038 with pump 1040. The rich aqueous absorbing medium is delivered to a heat exchanger 1001 where it is heated against the regenerated lean aqueous absorbing medium. The rich aqueous absorbing medium is then split into two portions 1038A, 1038B. In one aspect, about 73% by volume can be diverted to portion 1038A and about 27% by volume can be diverted to portion 1038B. The portion of rich aqueous absorbing medium 1038A is delivered to a heat exchanger 1042 where it is further heated against the regenerated aqueous lean absorbing medium and is subsequently fed into the regenerator 1044. The portion of the rich aqueous absorbing medium 1038B is delivered to a heat exchanger 1002 where it is heated against the overhead gas stream. Steam condensate is removed from the steam reboiler 1048 in line 1068 and is fed to a flash drum 1008 that separates the flashed steam in line 1009 from the flashed steam condensate in line 1010. The portion of the rich aqueous absorbing medium 1038B is delivered to a heat exchanger 1007 where it is further heated against the flashed steam in line 1009 and is subsequently fed into the regenerator 1044.

Figure 11:
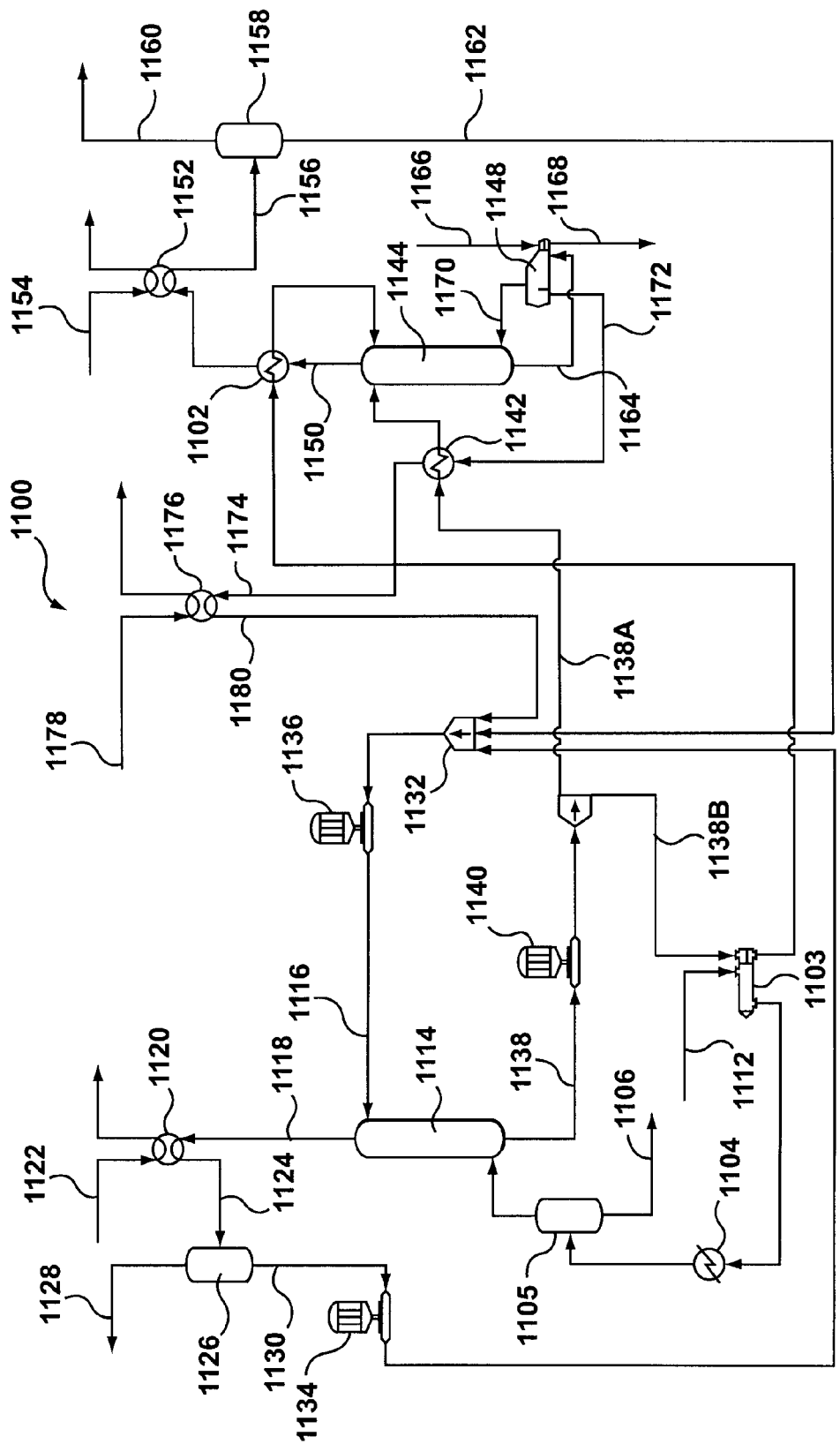
FIG. 11 is an apparatus for recovering a gaseous component from an incoming gas stream according to a tenth embodiment described in the specification.

FIG. 11 shows an apparatus 1100 for recovering carbon dioxide from an incoming gas stream according to a tenth embodiment described in the specification. The tenth embodiment is the same as the second embodiment, except as described in detail below.

In this embodiment, the rich aqueous absorbing medium 1138 is split immediately downstream of the pump 1140 into two portions 1138A, 1138B and there are two additional heat exchangers 1102, 1103 to transfer more heat to the portion of the rich aqueous absorbing medium 1138B before entering the regenerator. If required, the apparatus 1100 can also include a cooler 1104 to further cool down the incoming gas stream and a flash drum 1105 to separate out the excess moisture in line 1106 from the incoming gas stream before entering the contact apparatus 1114.

A rich aqueous absorbing medium containing dissolved carbon dioxide is removed from the contact apparatus 1114 by line 1138 with pump 1140. The rich aqueous absorbing medium is then split into two portions 1138A, 1138B. In one aspect, about 78% by volume can be diverted to portion 1138A and about 22% by volume can be diverted to portion 1138B. The portion of rich aqueous absorbing medium 1138A is delivered to a heat exchanger 1142 where it is heated against the regenerated lean aqueous absorbing medium and is subsequently fed to the regenerator 1144. The portion of the rich aqueous absorbing medium 1138B is delivered to a heat exchanger 1103 where it is heated against the incoming gas stream. The portion of the rich aqueous absorbing medium 1138B is delivered to a heat exchanger 1102 where it is heated against the overhead gas stream and is subsequently fed to the regenerator 1144.

Figure 12:
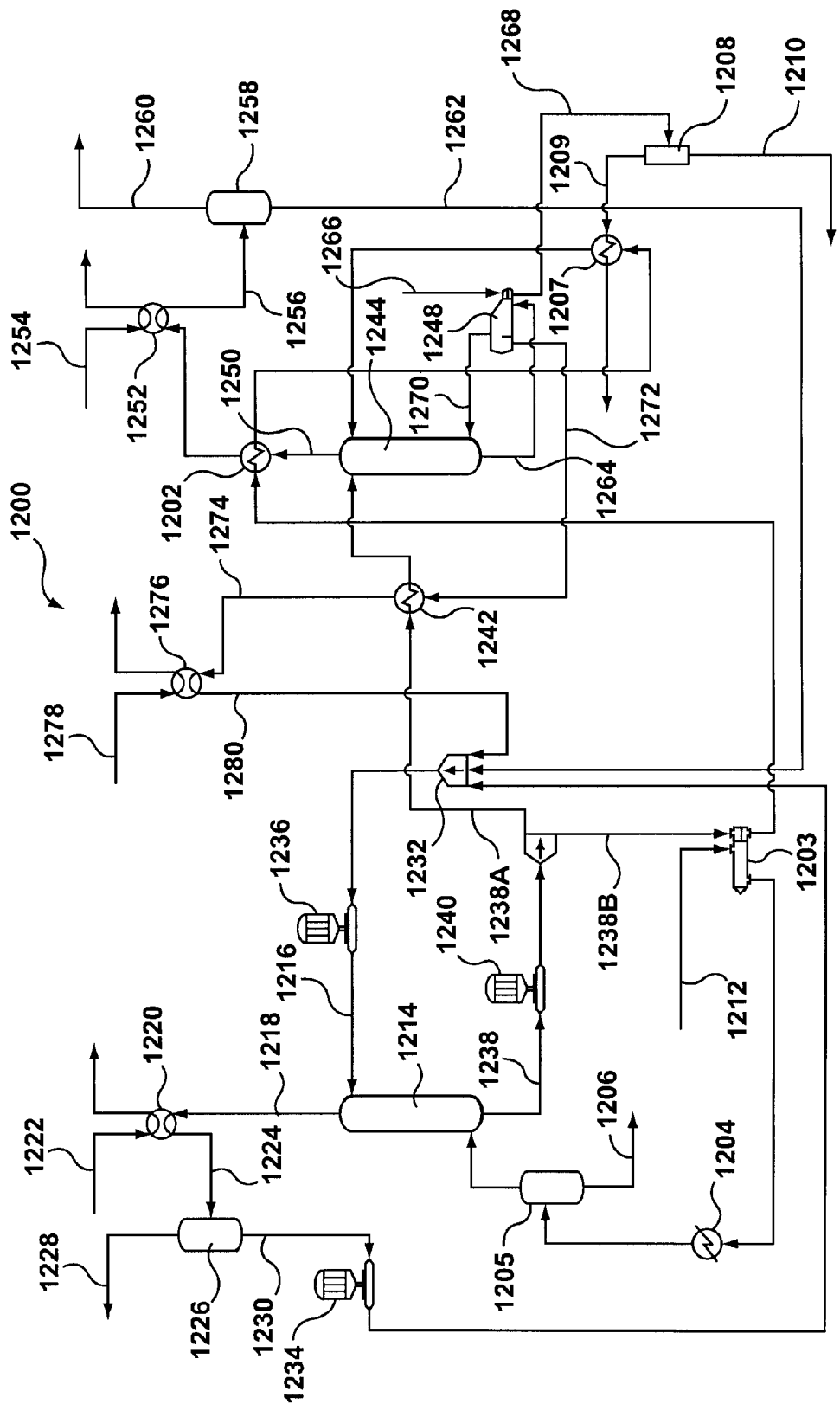
FIG. 12 is an apparatus for recovering a gaseous component from an incoming gas stream according to an eleventh embodiment described in the specification.

FIG. 12 shows an apparatus 1200 for recovering carbon dioxide from an incoming gas stream according to a eleventh embodiment described in the specification. The eleventh embodiment is the same as the tenth embodiment, except as described in detail below.

In this embodiment, there is an additional heat exchanger 1207 to transfer more heat to the portion of the rich aqueous absorbing medium 1238B before entering the regenerator and a flash drum 1208 to form flashed steam from the steam condensate exiting the reboiler.

A rich aqueous absorbing medium containing dissolved carbon dioxide is removed from the contact apparatus 1214 by line 1238 with pump 1240. The rich aqueous absorbing medium is then split into two portions 1238A, 1238B. In one aspect, about 79% by volume can be diverted to portion 1238A and about 21% by volume can be diverted to portion 1238B. The portion of rich aqueous absorbing medium 1238A is delivered to a heat exchanger 1242 where it is heated against the regenerated lean aqueous absorbing medium and is subsequently fed to the regenerator 1244. The portion of the rich aqueous absorbing medium 1238B is delivered to a heat exchanger 1203 where it is heated against the incoming gas stream. The portion of the rich aqueous absorbing medium 1138B is delivered to a heat exchanger 1202 where it is heated against the overhead gas stream. Steam condensate is removed from the steam reboiler 1248 in line 1268 and is fed to a flash drum 1208 that separates the flashed steam in line 1209 from the flashed steam condensate in line 1210. The portion of the rich aqueous absorbing medium 1238B is delivered to a heat exchanger 1207 where it is further heated against the flashed steam in line 1209 and is subsequently fed into the regenerator 1244.

FIGS. 13-17 show apparatuses for recovering carbon dioxide from an incoming gas stream according to further embodiments described in the specification. In these embodiments, the heated stream comprises a mixed condensate stream derived by combining at least a portion of the condensate stream recovered from the overhead gas stream with at least a portion of the condensate stream recovered from the lean treated gas stream to form the mixed condensate stream. As will be explained in more detail below, heat from at least one of the incoming gas stream, the overhead gas stream, the regenerated aqueous absorbing medium, and flashed steam derived from flashing a steam condensate is transferred to the heated stream before being recycled back to the regenerator.

Figure 13:
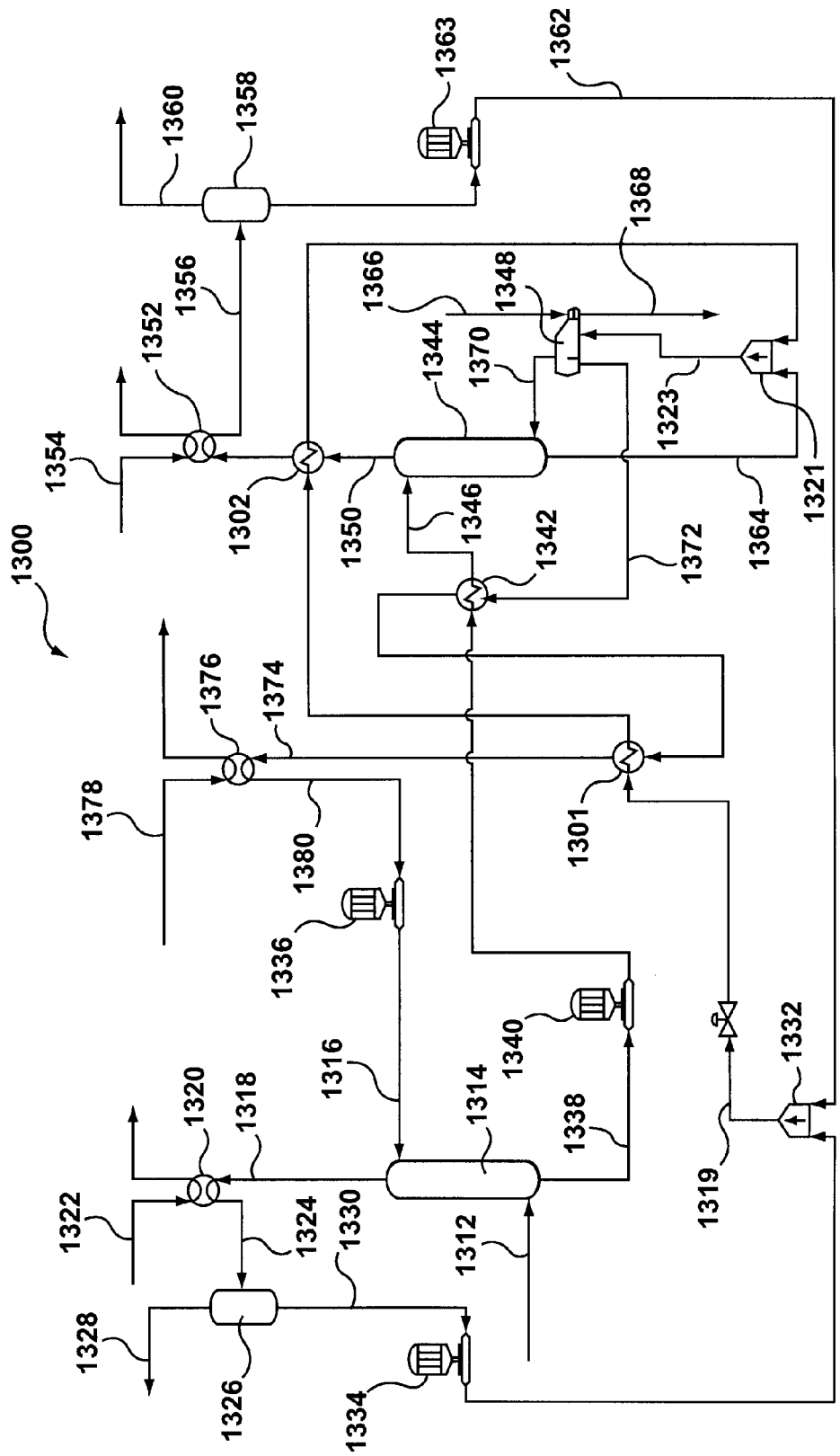
FIG. 13 is an apparatus for recovering a gaseous component from an incoming gas stream according to a twelfth embodiment described in the specification.

FIG. 13 shows an apparatus 1300 for recovering carbon dioxide from an incoming gas stream according to a twelfth embodiment described in the specification.

A carbon dioxide laden incoming gas stream in line 1312 is fed to a gas-liquid contact apparatus 1314 where it is contacted with a lean aqueous absorbing medium fed to the contact apparatus 1314 by line 1316. If required, the incoming gas stream can be pretreated to reduce the temperature and remove excess moisture before entering the contact apparatus 1314. Carbon dioxide is absorbed from the incoming gas stream 1312 to form a lean treated gas stream that exits the contact apparatus 1314 by line 1318. The lean treated gas stream 1318 passes through a cooler 1320 fed by cooling water 1322 to condense liquid from the lean treated gas stream 1318. A lean treated gas stream containing the condensed liquid in line 1324 is delivered to a flash drum 1326 to separate a water-depleted lean treated gas stream in line 1328 from a condensate stream in line 1330. The condensate stream in line 1330 is delivered to a mixer 1332 with pump 1334 and is mixed with a condensate stream recovered from the overhead gas stream to form a mixed condensate stream as will be described in more detail below.

A rich aqueous absorbing medium containing dissolved carbon dioxide is removed from the contact apparatus 1314 by line 1338 with pump 1340. The rich aqueous absorbing medium 1338 is heated in a cross heat exchanger 1342 against a regenerated aqueous absorbing medium and is subsequently fed to a regenerator 1344 by line 1346. The regenerator 1344 is operated at a temperature with heat provided from a steam reboiler 1348 so that the carbon dioxide is desorbed from the rich aqueous absorbing medium to form an overhead gas stream that exits the regenerator 1344 by line 1350. The overhead gas stream is cooled in a heat exchanger 1302 against the mixed condensate stream. The overhead gas stream passes through a condenser 1352 fed by cooling water 1354 to condense liquid from the overhead gas stream. An overhead gas stream containing the condensed liquid in line 1356 is delivered to a flash drum 1358 to separate a carbon dioxide rich product gas stream in line 1360 from a condensate stream in line 1362. The condensate stream 1362 is delivered to a mixer 1332 where it is mixed with condensate stream 1330 to form the mixed condensate stream in line 1319.

The mixed condensate stream in line 1319 is delivered to a heat exchanger 1301 where it is heated against the regenerated lean aqueous absorbing medium. The mixed condensate stream is delivered to a heat exchanger 1302 where it is heated against the overhead gas stream. At least a portion of the mixed condensate stream is recycled back to the regenerator 1344 in a vapor stream 1370 as will be described in more detail below.

A regenerated lean aqueous absorbing medium is removed from the regenerator 1344 in line 1364 and can be sent to a mixer 1321 where it can be mixed with the mixed condensate stream to form a supplemented mixed condensate stream 1323 before being fed into the steam reboiler 1348. Steam is fed to the steam reboiler in line 1366 and is removed in the form of a steam condensate in line 1368. Heat from the steam is transferred to the supplemented mixed condensate stream 1323 to form a vapor stream which is recycled back to the regenerator 1344 in line 1370 and a regenerated lean aqueous absorbing medium which exits the steam reboiler 1348 in line 1372. At least a portion of the mixed condensate stream enters the vapor stream 1370 and is recycled back into the regenerator 1344. The regenerated lean aqueous absorbing medium is delivered to heat exchanger 1342 by line 1372 where it is cooled by the rich aqueous absorbing medium in line 1338. The regenerated lean aqueous absorbing medium is delivered to a heat exchanger 1301 where it is further cooled by the mixed condensate stream. If required, the regenerated aqueous absorbing medium in line 1374 can be delivered to a cooler 1376 fed by cooling water 1378 to reduce the temperature of the regenerated aqueous absorbing medium to a level that is acceptable for the contact apparatus 1314. The regenerated aqueous absorbing medium is removed from the cooler 1376 in line 1380 and is ultimately recycled back to the contact apparatus 1314 in line 1316 with pump 1336.

Figure 14:
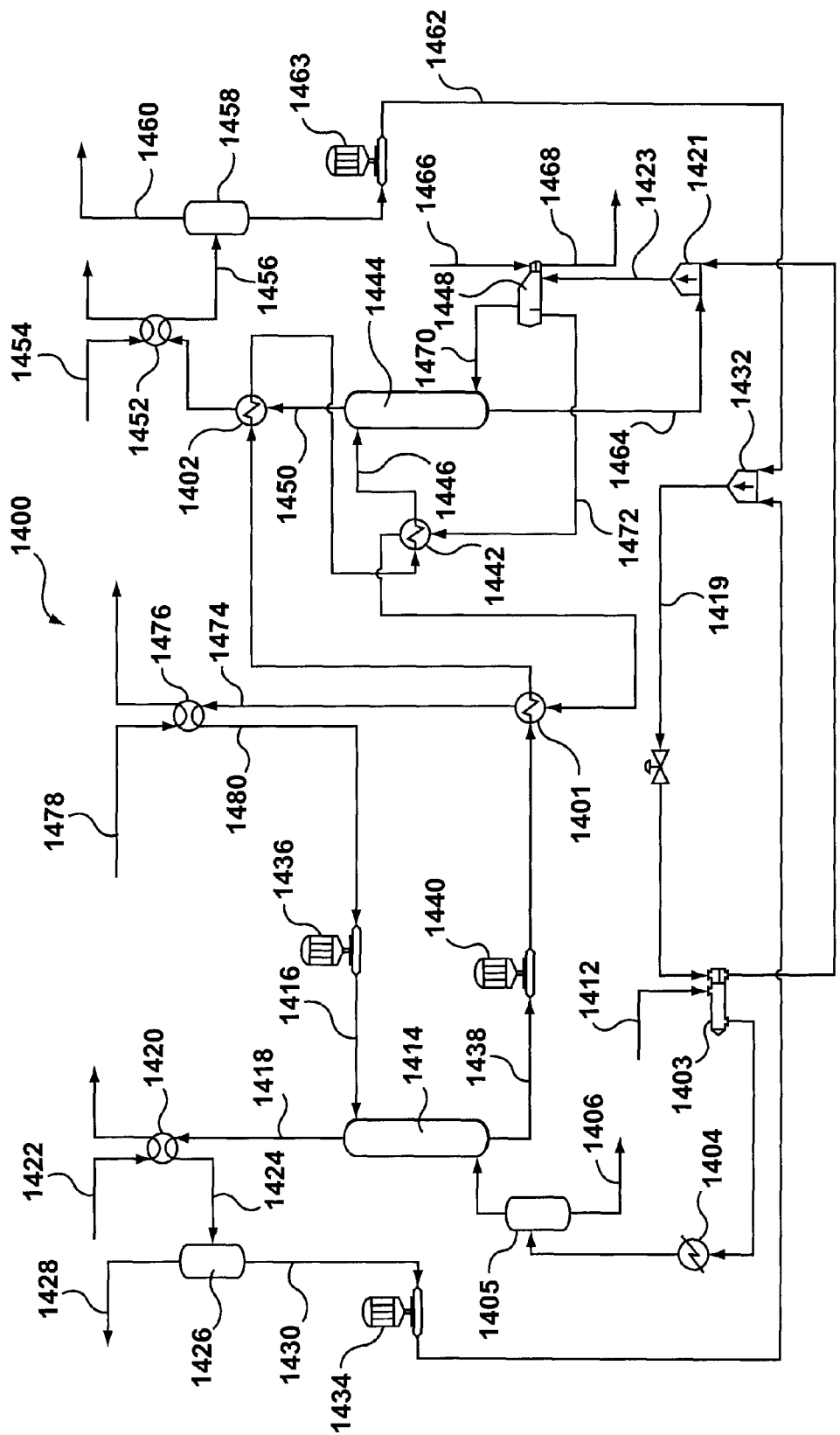
FIG. 14 is an apparatus for recovering a gaseous component from an incoming gas stream according to a thirteenth embodiment described in the specification.

FIG. 14 shows an apparatus 1400 for recovering carbon dioxide from an incoming gas stream according to a thirteenth embodiment described in the specification.

A carbon dioxide laden incoming gas stream in line 1412 can be cooled in a heat exchanger 1403 against a mixed condensate stream which will be described in more detail below. If required, the incoming gas stream can be fed to a cooler 1404 to further reduce the temperature to an acceptable level and can be subsequently fed to a flash drum 1405 to remove excess moisture in line 1406 before entering a gas-liquid contact apparatus 1414. The cooled incoming gas stream is fed to a gas-liquid contact apparatus 1414 where it is contacted with a lean aqueous absorbing medium fed to the contact apparatus 1414 by line 1416. Carbon dioxide is absorbed from the incoming gas stream 1412 to form a lean treated gas stream that exits the contact apparatus 1414 by line 1418. The lean treated gas stream 1418 passes through a cooler 1420 fed by cooling water 1422 to condense liquid from the lean treated gas stream 1418. A lean treated gas stream containing the condensed liquid in line 1424 is delivered to a flash drum 1426 to separate a water-depleted lean treated gas stream in line 1428 from a condensate stream in line 1430. The condensate stream in line 1430 is delivered to a mixer 1432 with pump 1434 and is mixed with a condensate stream recovered from the overhead gas stream as will be described in more detail below.

A rich aqueous absorbing medium containing dissolved carbon dioxide is removed from the contact apparatus 1414 by line 1438 with pump 1440. The rich aqueous absorbing medium is delivered to a heat exchanger 1401 where it is heated against the regenerated lean aqueous absorbing medium. The rich aqueous absorbing medium is delivered to a heat exchanger 1402 where it is heated against the overhead gas stream. The rich aqueous absorbing medium is delivered to a heat exchanger 1442 where it is further heated against the regenerated aqueous lean absorbing medium and is subsequently fed into the regenerator 1444 by line 1446. The regenerator 1444 is operated at a temperature with heat provided from a steam reboiler 1448 so that the carbon dioxide is desorbed from the rich aqueous absorbing medium to form an overhead gas stream that exits the regenerator 1444 by line 1450. The overhead gas stream is cooled in a heat exchanger 1402 against the rich aqueous absorbing medium. The overhead gas stream passes through a condenser 1452 fed by cooling water 1454 to condense liquid from the overhead gas stream. An overhead gas stream containing the condensed liquid in line 1456 is delivered to a flash drum 1458 to separate a carbon dioxide rich product gas stream in line 1460 from a condensate stream in line 1462. The condensate stream 1462 is delivered to a mixer 1432 where it is mixed with condensate stream 1430 to form a mixed condensate stream.

The mixed condensate stream in line 1419 is delivered to a heat exchanger 1403 where it is heated against the incoming gas stream. At least a portion of the mixed condensate stream is recycled back to the regenerator 1444 in a vapor stream 1470 as will be described in more detail below.

A regenerated lean aqueous absorbing medium is removed from the regenerator 1444 in line 1464 and can be sent to a mixer 1421 where it can be mixed with the mixed condensate stream to form a supplemented mixed condensate stream 1423 before being fed into the steam reboiler 1448. Steam is fed to the steam reboiler in line 1466 and is removed in the form of a steam condensate in line 1468. Heat from the steam is transferred to the supplemented mixed condensate stream 1423 to form a vapor stream which is recycled back to the regenerator 1444 in line 1470 and a regenerated lean aqueous absorbing medium which exits the steam reboiler 1448 in line 1472. At least a portion of the mixed condensate stream enters the vapor stream 1470 and is recycled back into the regenerator 1444. The regenerated lean aqueous absorbing medium is delivered to heat exchanger 1442 by line 1472 where it is cooled by the rich aqueous absorbing medium in line 1438. The regenerated lean aqueous absorbing medium is delivered to heat exchanger 1401 where it is further cooled by the rich aqueous absorbing medium. The regenerated aqueous absorbing medium in line 1474 is delivered to a cooler 1476 fed by cooling water 1478 to reduce the temperature of the regenerated aqueous absorbing medium to a level that is acceptable for the contact apparatus 1414. The regenerated aqueous absorbing medium is removed from the cooler 1476 in line 1480 is ultimately recycled back to the contact apparatus 1414 in line 1416 with pump 1436.

Figure 15:
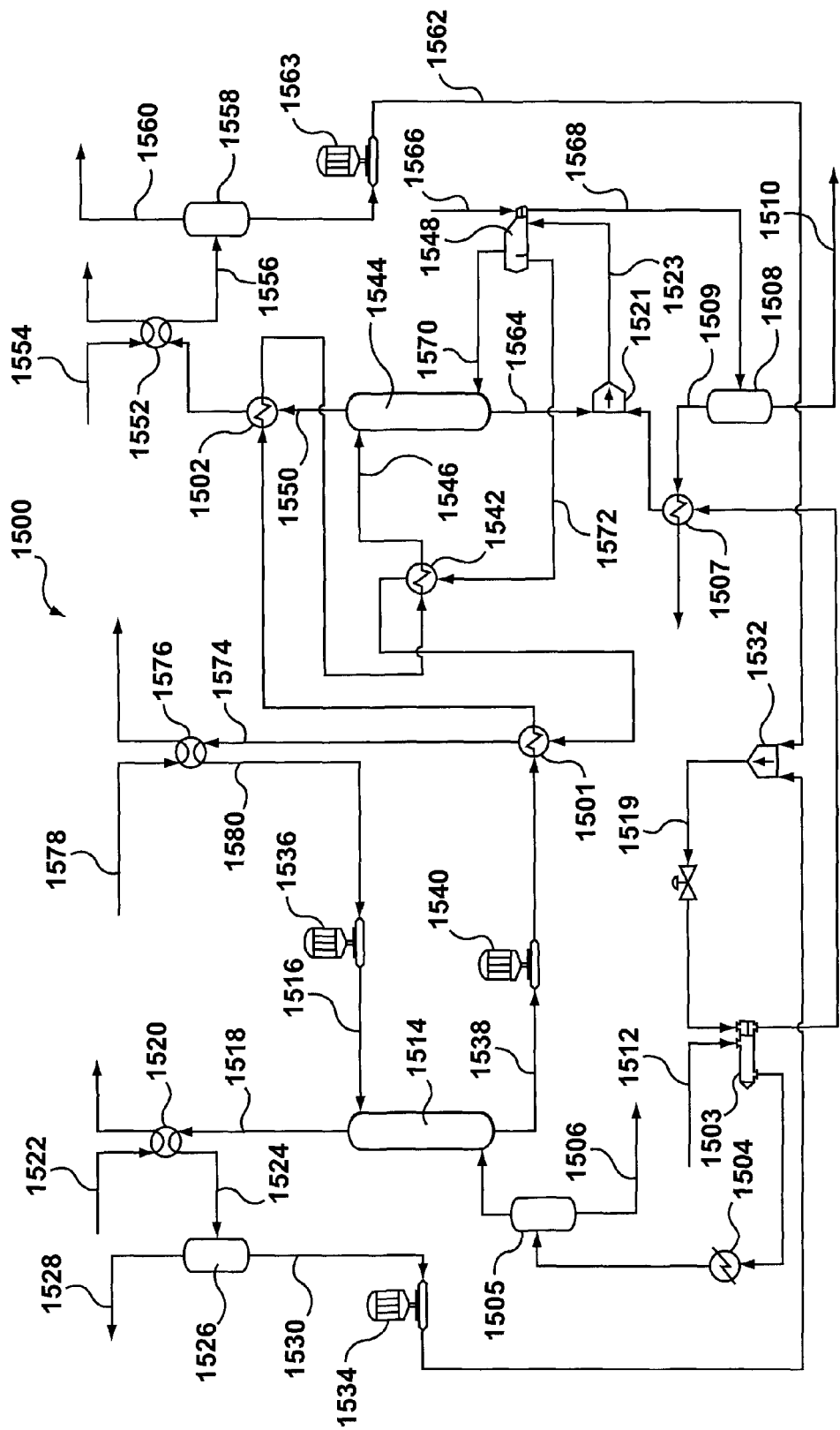
FIG. 15 is an apparatus for recovering a gaseous component from an incoming gas stream according to a fourteenth embodiment described in the specification.

FIG. 15 shows an apparatus 1500 for recovering carbon dioxide from an incoming gas stream according to a fourteenth embodiment described in the specification. The fourteenth embodiment is the same as the thirteenth embodiment, except as described below.

In this embodiment, there is an additional heat exchanger 1507 to transfer more heat to the mixed condensate stream before entering the regenerator and a flash drum 1508 to form flashed steam 1509 from the steam condensate 1568 exiting the steam reboiler 1548.

The mixed condensate stream in line 1519 is delivered to a heat exchanger 1503 where it is heated against the incoming gas stream. Steam condensate is removed from the steam reboiler 1548 in line 1568 and is fed to a flash drum 1508 that separates the flashed steam in line 1509 from the flashed steam condensate in line 1510. The mixed condensate stream is delivered to a heat exchanger 1507 where it is further heated against the flashed steam in line 1509. At least a portion of the mixed condensate stream is recycled back to the regenerator 1544 in a vapor stream 1570 as will be described in more detail below.

A regenerated lean aqueous absorbing medium is removed from the regenerator 1544 in line 1564 and can be sent to a mixer 1521 where it can be mixed with the mixed condensate stream to form a supplemented mixed condensate stream 1523 before being fed into the steam reboiler 1548. Steam is fed to the steam reboiler in line 1566 and is removed in the form of a steam condensate in line 1568. Heat from the steam is transferred to the supplemented mixed condensate stream 1523 to form a vapor stream which is recycled back to the regenerator 1544 in line 1570 and a regenerated lean aqueous absorbing medium which exits the steam reboiler 1548 in line 1572. At least a portion of the mixed condensate stream enters the vapor stream 1570 and is recycled back into the regenerator 1544.

Figure 16:
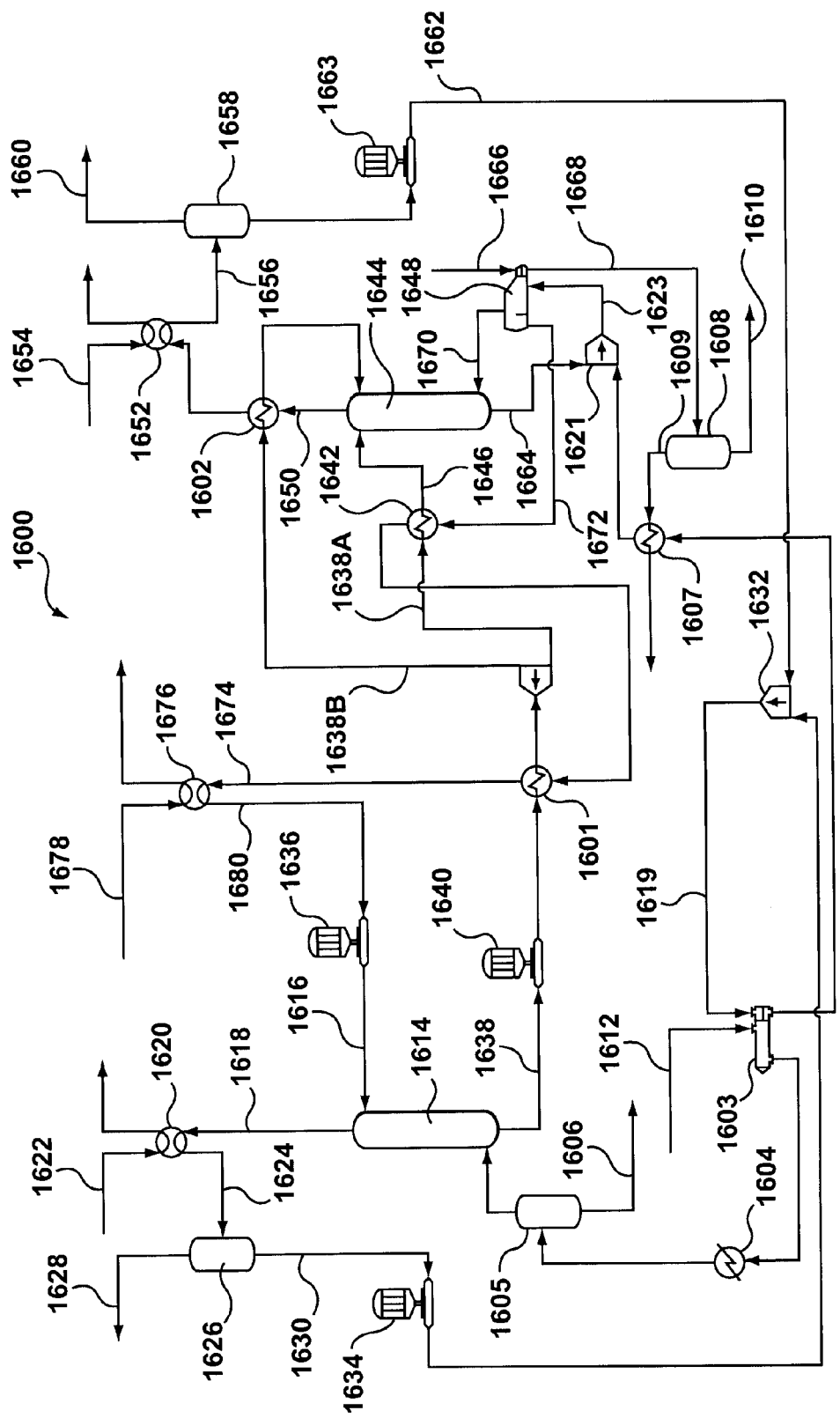
FIG. 16 is an apparatus for recovering a gaseous component from an incoming gas stream according to a fifteenth embodiment described in the specification.

FIG. 16 shows an apparatus 1600 for recovering carbon dioxide from an incoming gas stream according to a fifteenth embodiment described in the specification. The fifteenth embodiment is the same as the fourteenth embodiment, except as described below.

In this embodiment, the rich aqueous absorbing medium is split immediately downstream of heat exchanger 1601 into two portions 1638A, 1638B.

A rich aqueous absorbing medium containing dissolved carbon dioxide is removed from the contact apparatus 1614 by line 1638 with pump 1640. The rich aqueous absorbing medium is delivered to a heat exchanger 1601 where it is heated against the regenerated lean aqueous absorbing medium. The rich aqueous absorbing medium is then split into two portions 1638A, 1638B. The portion of rich aqueous absorbing medium 1638A is delivered to a heat exchanger 1642 where it is further heated against the regenerated aqueous lean absorbing medium and is subsequently fed into the regenerator 1644. The portion of the rich aqueous absorbing medium 1638B is delivered to a heat exchanger 1602 where it is heated against the overhead gas stream and is subsequently fed into the regenerator 1644.

Figure 17:
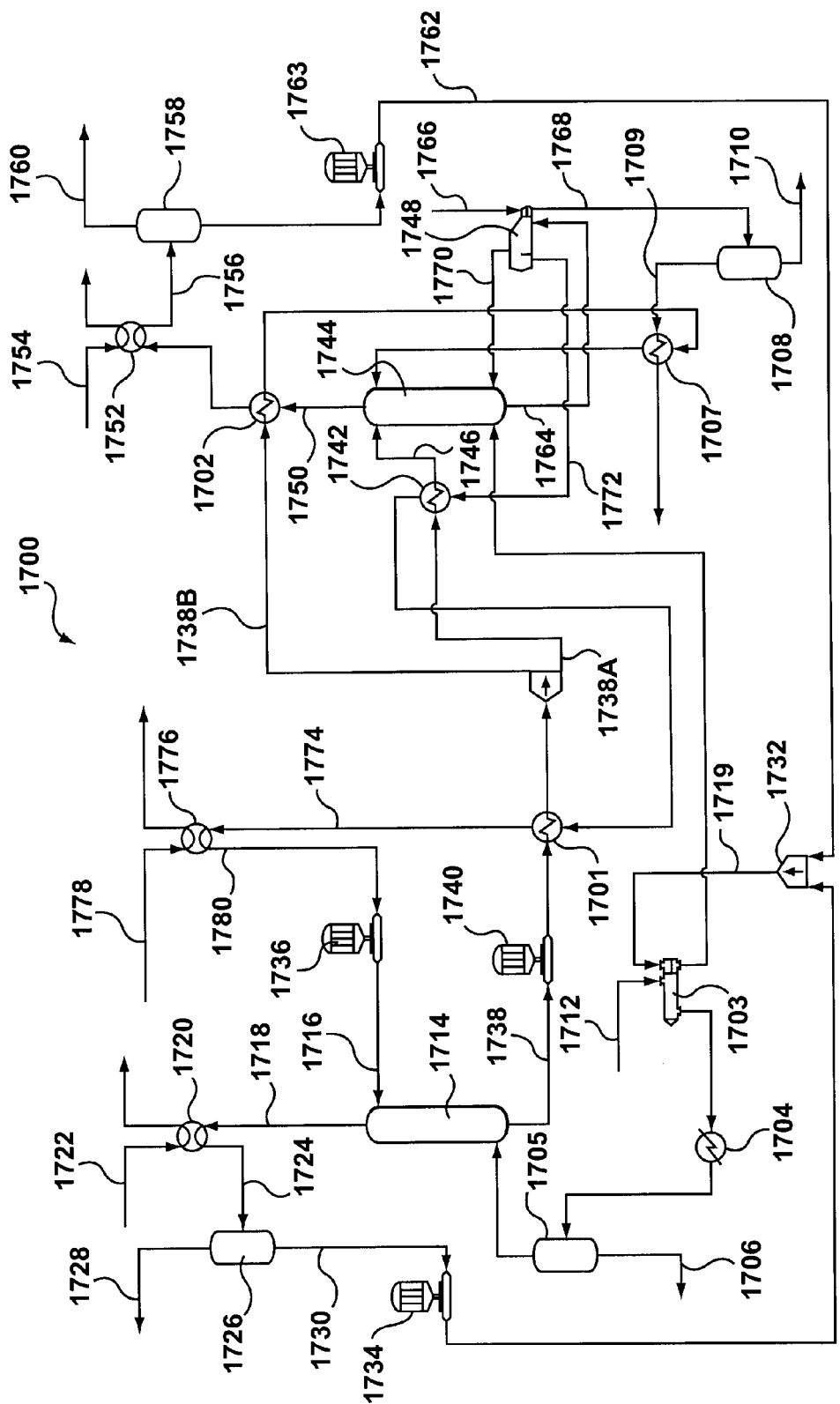
FIG. 17 is an apparatus for recovering a gaseous component from an incoming gas stream according to a sixteenth embodiment described in the specification.

FIG. 17 shows an apparatus 1700 for recovering carbon dioxide from an incoming gas stream according to a sixteenth embodiment described in the specification.

A carbon dioxide laden incoming gas stream in line 1712 can be cooled in a heat exchanger 1703 against a mixed condensate stream which will be described in more detail below. If required, the incoming gas stream can be fed to a cooler 1704 to further reduce the temperature to an acceptable level and can be subsequently fed to a flash drum 1705 to remove excess moisture in line 1706 before entering a gas-liquid contact apparatus 1714. The cooled incoming gas stream is fed to a gas-liquid contact apparatus 1714 where it is contacted with a lean aqueous absorbing medium fed to the contact apparatus 1714 by line 1716. Carbon dioxide is absorbed from the incoming gas stream 1712 to form a lean treated gas stream that exits the contact apparatus 1714 by line 1718. The lean treated gas stream 1718 passes through a cooler 1720 fed by cooling water 1722 to condense liquid from the lean treated gas stream 1718. A lean treated gas stream containing the condensed liquid in line 1724 is delivered to a flash drum 1726 to separate a water-depleted lean treated gas stream in line 1728 from a condensate stream in line 1730. The condensate stream in line 1730 is delivered to a mixer 1732 with pump 1734 and is mixed with a condensate stream recovered from the overhead gas stream as will be described in more detail below.

A rich aqueous absorbing medium containing dissolved carbon dioxide is removed from the contact apparatus 1714 by line 1738 with pump 1740. The rich aqueous absorbing medium is delivered to a heat exchanger 1701 where it is heated against the regenerated lean aqueous absorbing medium. The rich aqueous absorbing medium is then split into two portions 1738A, 1738B. The portion of rich aqueous absorbing medium 1738A is delivered to a heat exchanger 1742 where it is further heated against the regenerated aqueous lean absorbing medium and is subsequently fed into the regenerator 1744. The portion of the rich aqueous absorbing medium 1738B is delivered to a heat exchanger 1702 where it is heated against the overhead gas stream. Steam condensate is removed from the steam reboiler 1748 in line 1768 and is fed to a flash drum 1708 that separates the flashed steam in line 1709 from the flashed steam condensate in line 1710. The portion of the rich aqueous absorbing medium 1738B is delivered to a heat exchanger 1707 where it is further heated against the flashed steam in line 1709 and is subsequently fed into the regenerator 1744. The regenerator 1744 is operated at a temperature with heat provided from a steam reboiler 1748 so that the carbon dioxide is desorbed from the rich aqueous absorbing medium to form an overhead gas stream that exits the regenerator 1744 by line 1750. The overhead gas stream is cooled in a heat exchanger 1702 against the rich aqueous absorbing medium. The overhead gas stream passes through a condenser 1752 fed by cooling water 1754 to condense liquid from the overhead gas stream. An overhead gas stream containing the condensed liquid in line 1756 is delivered to a flash drum 1758 to separate a carbon dioxide rich product gas stream in line 1760 from a condensate stream in line 1762. The condensate stream 1762 is delivered to a mixer 1732 where it is mixed with condensate stream 1730 to form a mixed condensate stream.

The mixed condensate stream in line 1719 is delivered to a heat exchanger 1703 where it is heated against the incoming gas stream and is subsequently fed to the regenerator 1744.

A regenerated lean aqueous absorbing medium is removed from the regenerator 1744 in line 1764 and is fed to the steam reboiler 1748. Steam is fed to the steam reboiler in line 1766 and is removed in the form of a steam condensate in line 1768. Heat from the steam is transferred to the regenerated lean aqueous absorbing medium to form a vapor stream which is recycled back to the regenerator 1744 in line 1770 and a regenerated lean aqueous absorbing medium which exits the steam reboiler 1748 in line 1772. The regenerated lean aqueous absorbing medium is delivered to heat exchanger 1742 by line 1772 where it is cooled by the portion of the rich aqueous absorbing medium in line 1738A. If required, the regenerated lean aqueous absorbing medium can be delivered to heat exchanger 1701 where it is further cooled by the rich aqueous absorbing medium. The regenerated aqueous absorbing medium in line 1774 is delivered to a cooler 1776 fed by cooling water 1778 to reduce the temperature of the regenerated aqueous absorbing medium to a level that is acceptable for the contact apparatus 1714. The regenerated aqueous absorbing medium is removed from the cooler 1776 in line 1780 is ultimately recycled back to the contact apparatus 1714 in line 1716 with pump 1736.

FIGS. 18-24 show apparatuses for recovering carbon dioxide from an incoming gas stream according to further embodiments described in the specification. In these embodiments, the heated stream comprises a first mixed condensate stream portion and a second mixed condensate stream portion derived by combining at least a portion of a condensate stream recovered from an overhead gas stream with at least a portion of the condensate stream recovered from the lean treated gas stream to form the mixed condensate stream and subsequently splitting the mixed condensate stream to form the first mixed condensate stream portion and the second mixed condensate stream portion. As will be explained in more detail below, heat from at least one of the incoming gas stream, the overhead gas stream, the regenerated aqueous absorbing medium, or flashed steam derived from a flashing a steam condensate is transferred to at least one of the mixed condensate stream before being split into two portions, the first mixed condensate stream portion or the second mixed condensate stream portion before being recycled back to the regenerator.

Figure 18:
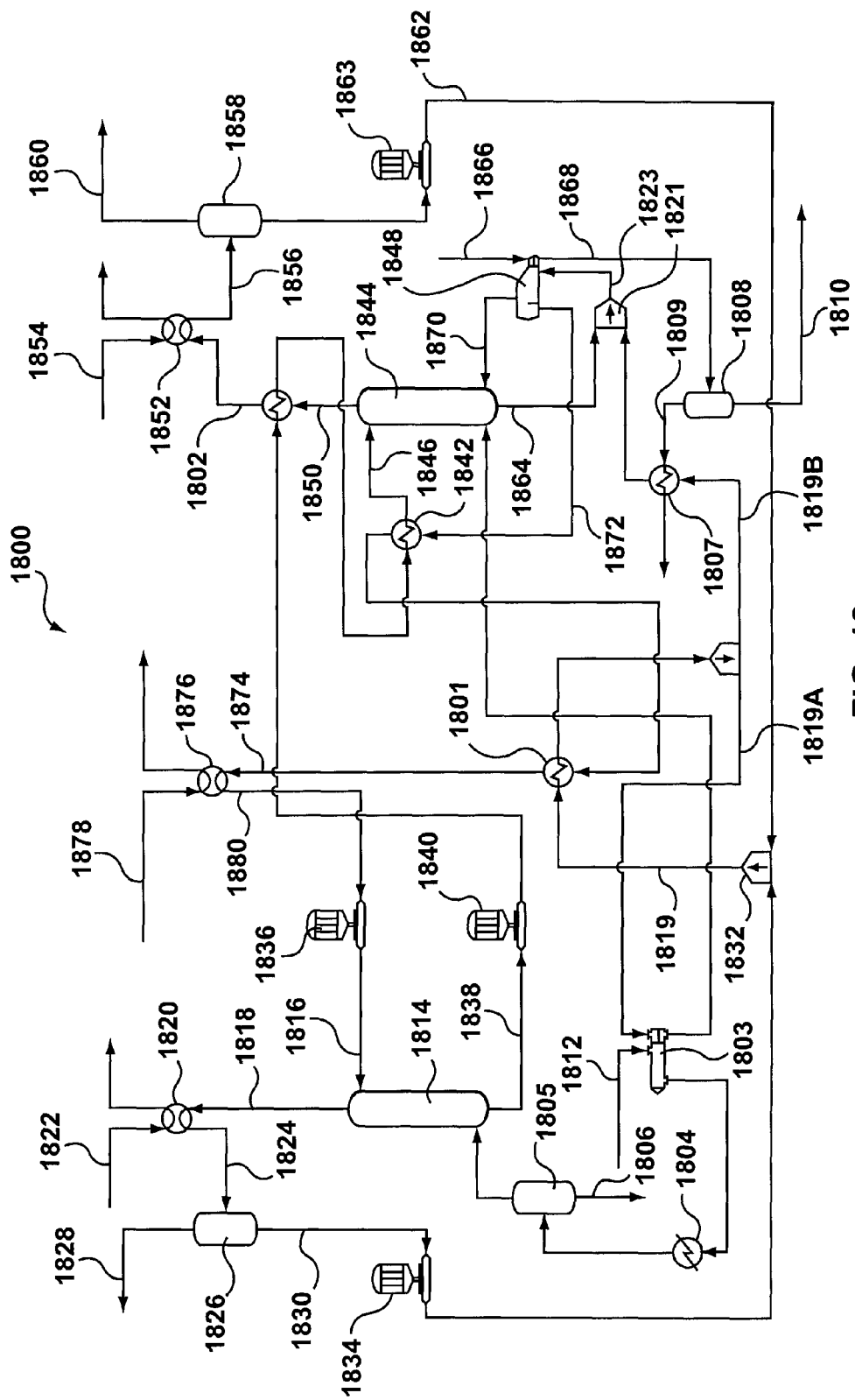
FIG. 18 is an apparatus for recovering a gaseous component from an incoming gas stream according to a seventeenth embodiment described in the specification.

FIG. 18 shows an apparatus 1800 for recovering carbon dioxide from an incoming gas stream according to a seventeenth embodiment described in the specification.

A carbon dioxide laden incoming gas stream in line 1812 can be cooled in a heat exchanger 1803 against a portion of a mixed condensate stream 1819A which will be described in more detail below. If required, the incoming gas stream can be fed to a cooler 1804 to further reduce the temperature to an acceptable level and can be subsequently fed to a flash drum 1805 to remove excess moisture in line 1806 before entering a gas-liquid contact apparatus 1814. The cooled incoming gas stream is fed to a gas-liquid contact apparatus 1814 where it is contacted with a lean aqueous absorbing medium fed to the contact apparatus 1814 by line 1816. Carbon dioxide is absorbed from the incoming gas stream 1812 to form a lean treated gas stream that exits the contact apparatus 1814 by line 1818. The lean treated gas stream 1818 passes through a cooler 1820 fed by cooling water 1822 to condense liquid from the lean treated gas stream 1818. A lean treated gas stream containing the condensed liquid in line 1824 is delivered to a flash drum 1826 to separate a water-depleted lean treated gas stream in line 1828 from a condensate stream in line 1830. The condensate stream in line 1830 is delivered to a mixer 1832 with pump 1834 and is mixed with a condensate stream recovered from the overhead gas stream as will be described in more detail below.

A rich aqueous absorbing medium containing dissolved carbon dioxide is removed from the contact apparatus 1814 by line 1838 with pump 1840. The rich aqueous absorbing medium is delivered to a heat exchanger 1802 where it is heated against the overhead gas stream. The rich aqueous absorbing medium is delivered to a heat exchanger 1842 where it is further heated against the regenerated aqueous lean absorbing medium and is subsequently fed into the regenerator 1844 by line 1846. The regenerator 1844 is operated at a temperature with heat provided from a steam reboiler 1848 so that the carbon dioxide is desorbed from the rich aqueous absorbing medium to form an overhead gas stream that exits the regenerator 1844 by line 1850. The overhead gas stream is cooled in a heat exchanger 1802 against the rich aqueous absorbing medium. The overhead gas stream passes through a condenser 1852 fed by cooling water 1854 to condense liquid from the overhead gas stream. An overhead gas stream containing the condensed liquid in line 1856 is delivered to a flash drum 1858 to separate a carbon dioxide rich product gas stream in line 1860 from a condensate stream in line 1862. The condensate stream 1862 is delivered to a mixer 1832 where it is mixed with condensate stream 1830 to form a mixed condensate stream.

The mixed condensate stream in line 1819 is delivered to a heat exchanger 1801 where it is heated against the regenerated lean aqueous absorbing medium. The mixed condensate stream is split into two streams 1819A and 1819B. In one aspect, about 23% by volume can be diverted to portion 1819A and about 77% by volume can be diverted to portion 1819B. The portion of the mixed condensate stream 1819A is delivered to a heat exchanger 1803 where it is heated against the incoming gas and is subsequently fed to the regenerator 1844. Steam condensate is removed from the steam reboiler 1848 in line 1868 and is fed to a flash drum 1808 that separates the flashed steam in line 1809 from the flashed steam condensate in line 1810. The portion of mixed condensate stream 1819B is delivered to a heat exchanger 1807 where it is further heated against the flashed steam in line 1809. At least a portion of the mixed condensate stream is recycled back to the regenerator 1844 in a vapor stream 1870 as will be described in more detail below.

A regenerated lean aqueous absorbing medium is removed from the regenerator 1844 in line 1864 and can be sent to a mixer 1821 where it can be mixed with the portion of the mixed condensate stream 1819B to form a supplemented mixed condensate stream 1823 before being fed into the steam reboiler 1848. Steam is fed to the steam reboiler in line 1866 and is removed in the form of a steam condensate in line 1868. Heat from the steam is transferred to the supplemented mixed condensate stream 1823 to form a vapor stream which is recycled back to the regenerator 1844 in line 1870 and a regenerated lean aqueous absorbing medium which exits the steam reboiler 1848 in line 1872. At least a portion of the mixed condensate stream 1819B enters the vapor stream 1870 and is recycled back into the regenerator 1844. The regenerated lean aqueous absorbing medium is delivered to heat exchanger 1842 by line 1872 where it is cooled by the rich aqueous absorbing medium in line 1838. The regenerated lean aqueous absorbing medium is delivered to heat exchanger 1801 where it is further cooled by the mixed condensate stream 1819. If required, the regenerated aqueous absorbing medium in line 1874 can be delivered to a cooler 1876 fed by cooling water 1878 to reduce the temperature of the regenerated aqueous absorbing medium to a level that is acceptable for the contact apparatus 1814. The regenerated aqueous absorbing medium is removed from the cooler 1876 in line 1880 and is ultimately recycled back to the contact apparatus 1814 in line 1816 with pump 1836.

Figure 19:
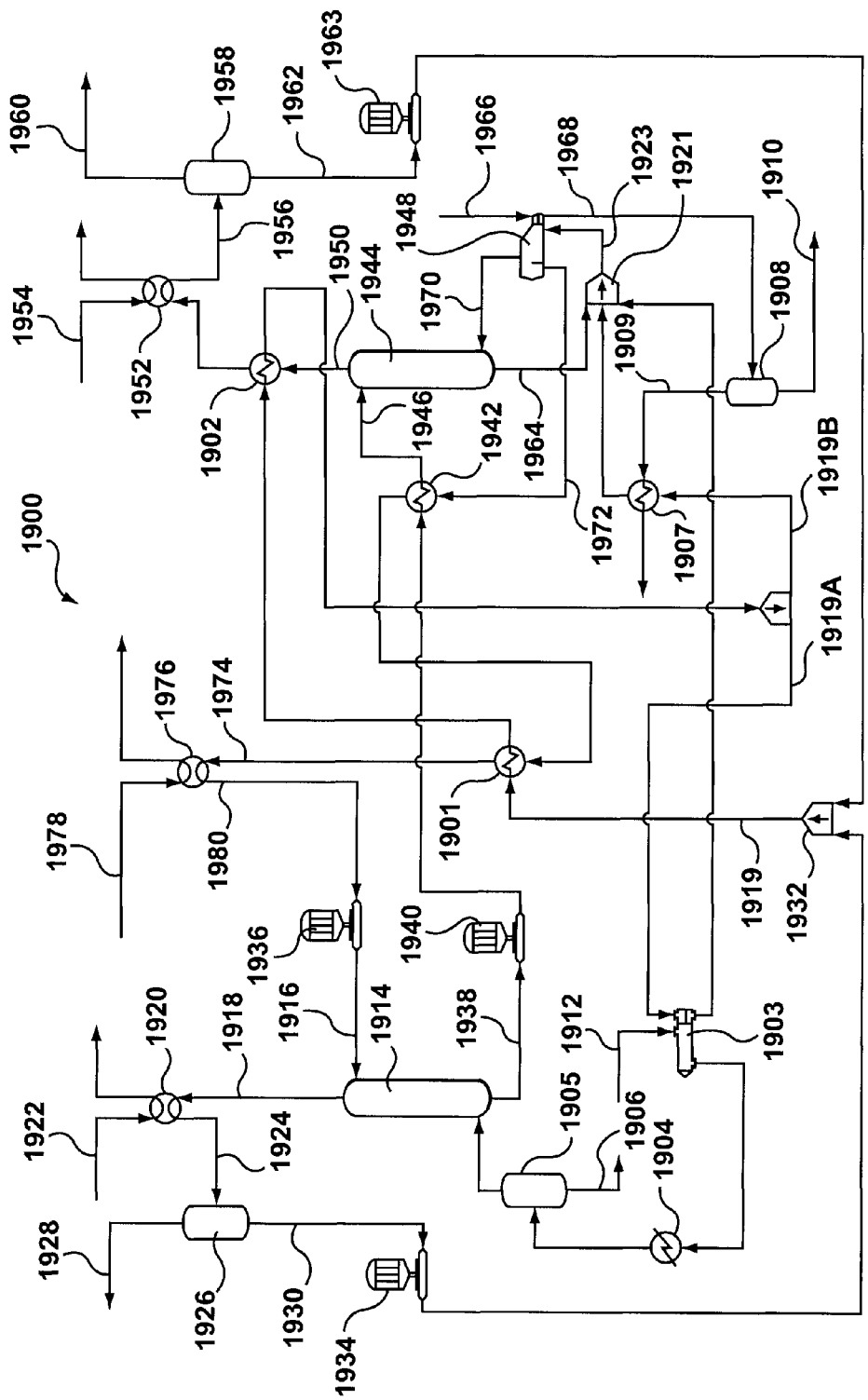
FIG. 19 is an apparatus for recovering a gaseous component from an incoming gas stream according to an eighteenth embodiment described in the specification.

FIG. 19 shows an apparatus 1900 for recovering carbon dioxide from an incoming gas stream according to a eighteenth embodiment described in the specification.

A carbon dioxide laden incoming gas stream in line 1912 can be cooled in a heat exchanger 1903 against a portion of a mixed condensate stream 1919A which will be described in more detail below. If required, the incoming gas stream can be fed to a cooler 1904 to further reduce the temperature to an acceptable level and can be subsequently fed to a flash drum 1905 to remove excess moisture in line 1906 before entering a gas-liquid contact apparatus 1914. The cooled incoming gas stream is fed to a gas-liquid contact apparatus 1914 where it is contacted with a lean aqueous absorbing medium fed to the contact apparatus 1914 by line 1916. Carbon dioxide is absorbed from the incoming gas stream 1912 to form a lean treated gas stream that exits the contact apparatus 1914 by line 1918. The lean treated gas stream 1918 passes through a cooler 1920 fed by cooling water 1922 to condense liquid from the lean treated gas stream 1918. A lean treated gas stream containing the condensed liquid in line 1924 is delivered to a flash drum 1926 to separate a water-depleted lean treated gas stream in line 1928 from a condensate stream in line 1930. The condensate stream in line 1930 is delivered to a mixer 1932 with pump 1934 and is mixed with a condensate stream recovered from the overhead gas stream as will be described in more detail below.

A rich aqueous absorbing medium containing dissolved carbon dioxide is removed from the contact apparatus 1914 by line 1938 with pump 1940. The rich aqueous absorbing medium is delivered to a heat exchanger 1942 where it is heated against the regenerated aqueous lean absorbing medium and is subsequently fed into the regenerator 1944 by line 1946. The regenerator 1944 is operated at a temperature with heat provided from a steam reboiler 1948 so that the carbon dioxide is desorbed from the rich aqueous absorbing medium to form an overhead gas stream that exits the regenerator 1944 by line 1950. The overhead gas stream is cooled in a heat exchanger 1902 against the mixed condensate stream. The overhead gas stream passes through a condenser 1952 fed by cooling water 1954 to condense liquid from the overhead gas stream. An overhead gas stream containing the condensed liquid in line 1956 is delivered to a flash drum 1958 to separate a carbon dioxide rich product gas stream in line 1960 from a condensate stream in line 1962. The condensate stream 1962 is delivered to a mixer 1932 where it is mixed with condensate stream 1930 to form a mixed condensate stream.

The mixed condensate stream in line 1919 is delivered to a heat exchanger 1901 where it is heated against the regenerated lean aqueous absorbing medium. The mixed condensate stream is delivered to a heat exchanger 1902 where it is heated against the overhead gas stream. The mixed condensate stream is split into two streams 1919A and 1919B. In one aspect, about 82.5% by volume can be diverted to portion 1919A and about 17.5% by volume can be diverted to portion 1919B. The portion of the mixed condensate stream 1919A is delivered to a heat exchanger 1903 where it is heated against the incoming gas. At least a portion of the mixed condensate stream 1919A is recycled back to the regenerator 1944 in a vapor stream 1970 as will be described in more detail below. Steam condensate is removed from the steam reboiler 1948 in line 1968 and is fed to a flash drum 1908 that separates the flashed steam in line 1909 from the flashed steam condensate in line 1910. The portion of mixed condensate stream 1919B is delivered to a heat exchanger 1907 where it is further heated against the flashed steam in line 1909. At least a portion of the mixed condensate stream 1919B is recycled back to the regenerator 1944 in a vapor stream 1970 as will be described in more detail below.

A regenerated lean aqueous absorbing medium is removed from the regenerator 1944 in line 1964 and can be sent to a mixer 1921 where it can be mixed with the portion of the mixed condensate stream 1919A and the portion of the mixed condensate stream 1919B to form a supplemented mixed condensate stream 1923 before being fed into the steam reboiler 1948. Steam is fed to the steam reboiler in line 1966 and is removed in the form of a steam condensate in line 1968. Heat from the steam is transferred to the supplemented mixed condensate stream 1923 to form a vapor stream which is recycled back to the regenerator 1944 in line 1970 and a regenerated lean aqueous absorbing medium which exits the steam reboiler 1948 in line 1972. At least a portion of the mixed condensate streams 1919A, 1919B enters the vapor stream 1970 and is recycled back into the regenerator 1944. The regenerated lean aqueous absorbing medium is delivered to heat exchanger 1942 by line 1972 where it is cooled by the rich aqueous absorbing medium in line 1938. The regenerated lean aqueous absorbing medium is delivered to heat exchanger 1901 where it is further cooled by the mixed condensate stream 1919. If required, the regenerated aqueous absorbing medium in line 1974 can be delivered to a cooler 1976 fed by cooling water 1978 to reduce the temperature of the regenerated aqueous absorbing medium to a level that is acceptable for the contact apparatus 1914. The regenerated aqueous absorbing medium is removed from the cooler 1976 in line 1980 and is ultimately recycled back to the contact apparatus 1914 in line 1916 with pump 1936.

Figure 20:
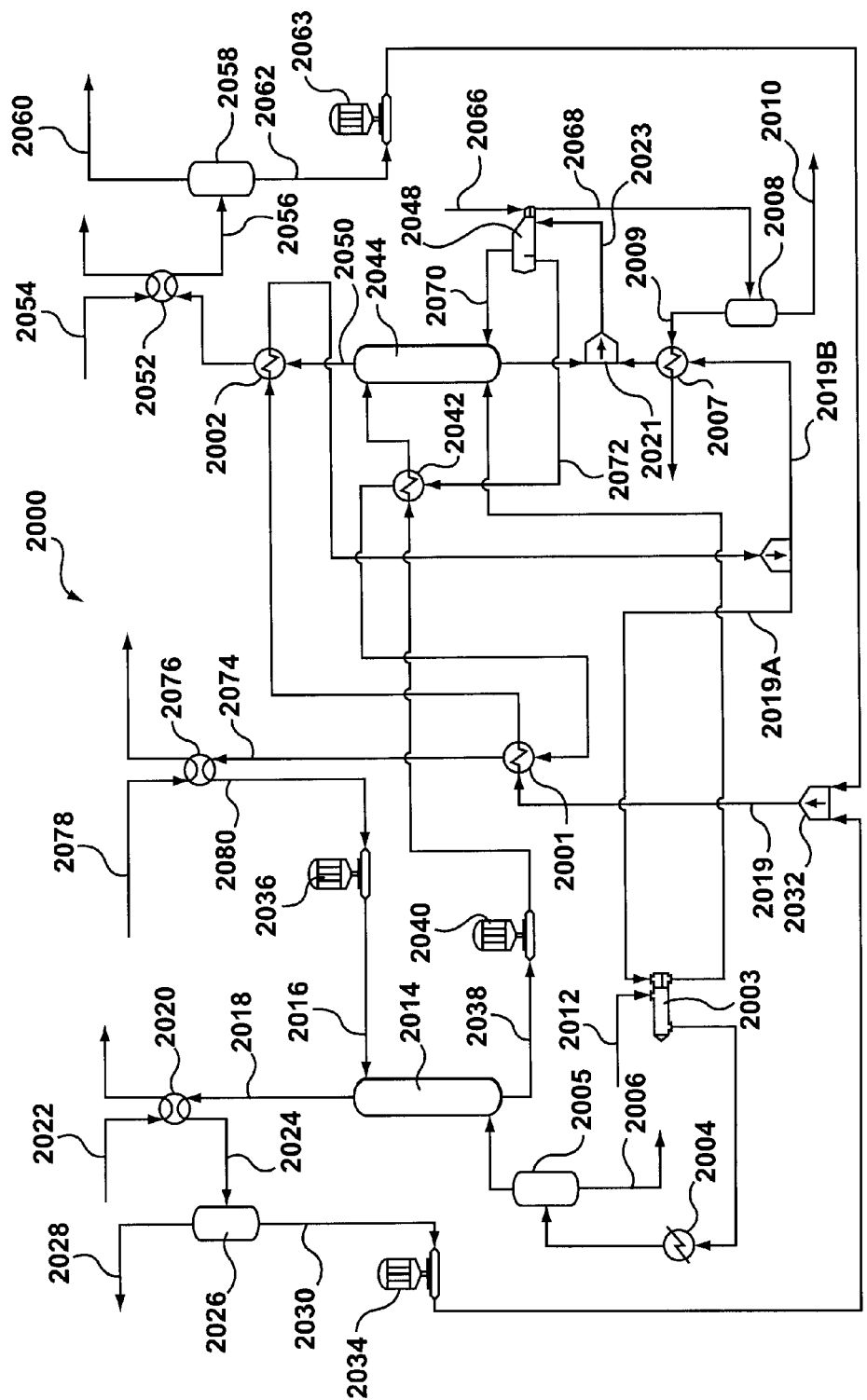
FIG. 20 is an apparatus for recovering a gaseous component from an incoming gas stream according to an nineteenth embodiment described in the specification.

FIG. 20 shows an apparatus 2000 for recovering carbon dioxide from an incoming gas stream according to a nineteenth embodiment described in the specification. The nineteenth embodiment is the same as the eighteenth embodiment, except as described in detail below.

In this embodiment, the portion of the mixed condensate stream 2019A that exits the heat exchanger 2003 is fed directly back into the regenerator 2044 instead of being fed to the steam reboiler 2048 where it is sent back into the regenerator 2044 through the vapor stream 2070.

Figure 21:
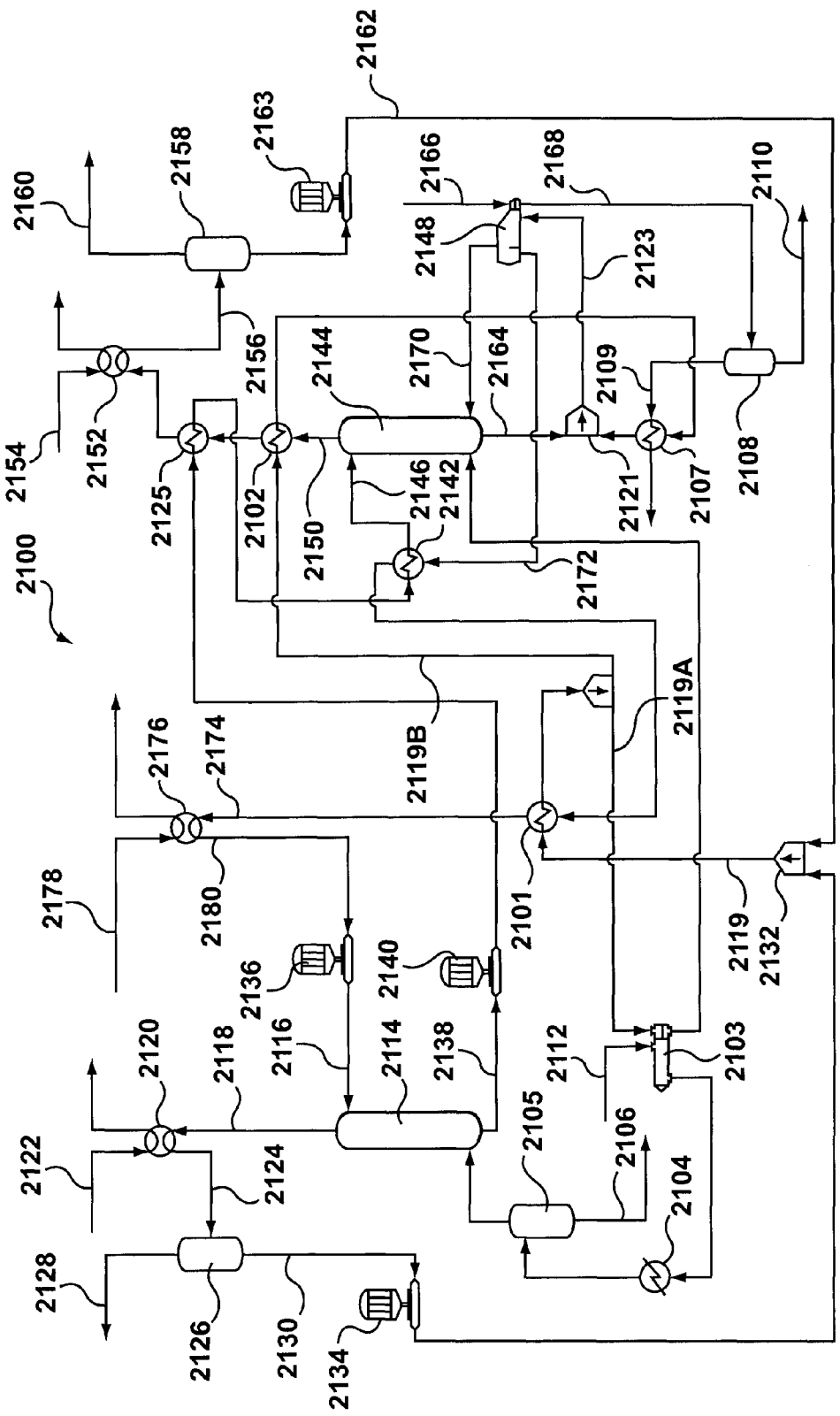
FIG. 21 is an apparatus for recovering a gaseous component from an incoming gas stream according to a twentieth embodiment described in the specification.

FIG. 21 shows an apparatus 2100 for recovering carbon dioxide from an incoming gas stream according to a twentieth embodiment described in the specification. The twentieth embodiment is the same as the nineteenth embodiment, except as described in detail below.

In this embodiment, there is an additional heat exchanger 2125 to transfer more heat to the rich aqueous absorbing medium before entering the regenerator 2144 and the mixed condensate stream is split immediately downstream of heat exchanger 2101 into two portions 2119A, 2119B.

A rich aqueous absorbing medium containing dissolved carbon dioxide is removed from the contact apparatus 2114 by line 2138 with pump 2140. The rich aqueous absorbing medium is delivered to a heat exchanger 2125 where it is heated against the overhead gas stream. The rich aqueous absorbing medium is delivered to a heat exchanger 2142 where it is heated against the regenerated aqueous lean absorbing medium and is subsequently fed into the regenerator 2144 by line 2146.

The mixed condensate stream in line 2119 is delivered to a heat exchanger 2101 where it is heated against the regenerated lean aqueous absorbing medium. The mixed condensate stream is split into two streams 2119A and 2119B. In one aspect, about 28% by volume can be diverted to portion 2119A and about 72% by volume can be diverted to portion 2119B. The portion of the mixed condensate stream 2119A is delivered to a heat exchanger 2103 where it is heated against the incoming gas and is subsequently fed back into to the regenerator 2144. The portion of the mixed condensate stream 2119B is delivered to a heat exchanger 2102 where it is heated against the overhead gas stream. Steam condensate is removed from the steam reboiler 2148 in line 2168 and is fed to a flash drum 2108 that separates the flashed steam in line 2109 from the flashed steam condensate in line 2110. The portion of mixed condensate stream 2119B is delivered to a heat exchanger 2107 where it is further heated against the flashed steam in line 2109. At least a portion of the mixed condensate stream 2119B is recycled back to the regenerator 2144 in a vapor stream 2170 as previously described above.

Figure 22:
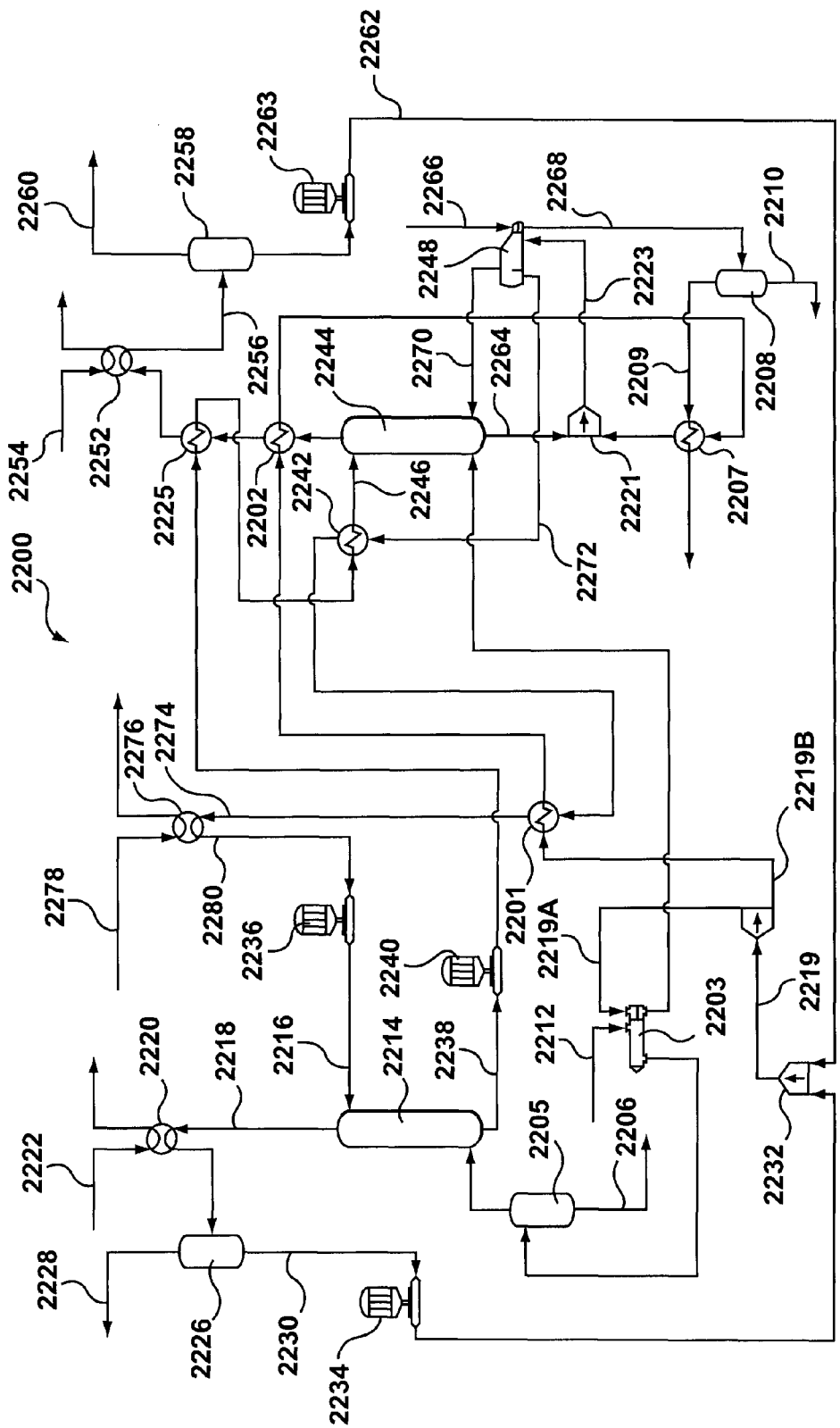
FIG. 22 is an apparatus for recovering a gaseous component from an incoming gas stream according to a twenty-first embodiment described in the specification.

FIG. 22 shows an apparatus 2200 for recovering carbon dioxide from an incoming gas stream according to a twenty-first embodiment described in the specification. The twenty-first embodiment is the same as the twentieth embodiment, except as described in detail below.

In this embodiment, the mixed condensate stream is split immediately downstream of the mixer 2232 into two portions 2219A, 2219B.

The mixed condensate stream is split into two streams 2219A and 2219B. In one aspect, about 86% by volume can be diverted to portion 2219A and about 14% by volume can be diverted to portion 2219B. The portion of the mixed condensate stream 2219A is delivered to a heat exchanger 2203 where it is heated against the incoming gas and is subsequently fed back into to the regenerator 2244. The portion of the mixed condensate stream in line 2219B is delivered to a heat exchanger 2201 where it is heated against the regenerated lean aqueous absorbing medium. The portion of the mixed condensate stream 2219B is delivered to a heat exchanger 2202 where it is heated against the overhead gas stream. Steam condensate is removed from the steam reboiler 2248 in line 2268 and is fed to a flash drum 2208 that separates the flashed steam in line 2209 from the flashed steam condensate in line 2210. The portion of mixed condensate stream 2219B is delivered to a heat exchanger 2207 where it is further heated against the flashed steam in line 2209. At least a portion of the mixed condensate stream 2219B is recycled back to the regenerator 2244 in a vapor stream 2270 as previously described above.

Figure 23:
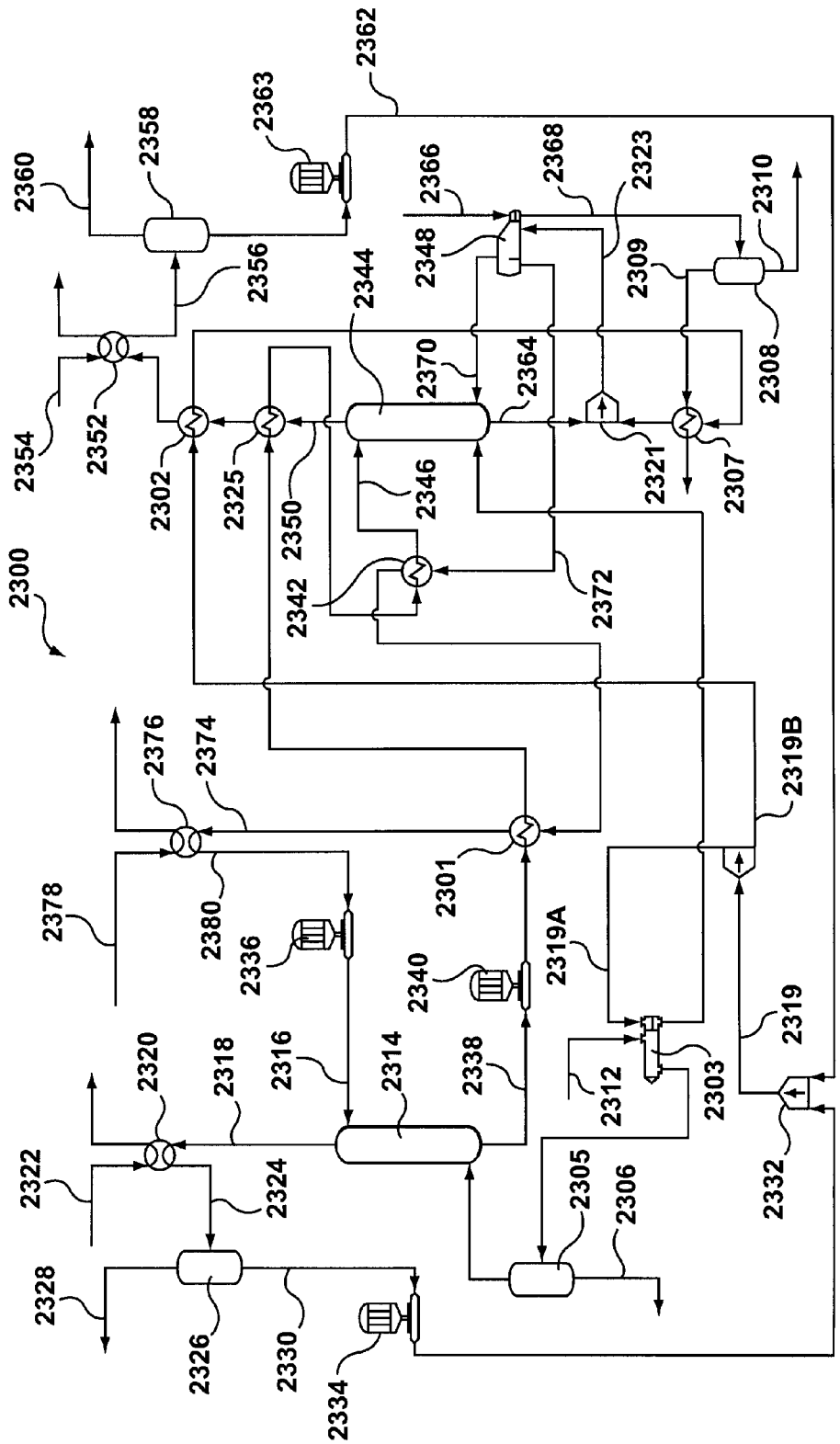
FIG. 23 is an apparatus for recovering a gaseous component from an incoming gas stream according to a twenty-second embodiment described in the specification.

FIG. 23 shows an apparatus 2300 for recovering carbon dioxide from an incoming gas stream according to a twenty-second embodiment described in the specification. The twenty-second embodiment is the same as the twenty-first embodiment, except as described in detail below.

In this embodiment, heat exchanger 2301 is used to transfer heat to the rich aqueous absorbing medium instead of to the portion of the mixed condensate stream 2319B.

A rich aqueous absorbing medium containing dissolved carbon dioxide is removed from the contact apparatus 2314 by line 2338 with pump 2340. The rich aqueous absorbing medium is delivered to a heat exchanger 2301 where it is heated against the regenerated lean aqueous absorbing medium. The rich aqueous absorbing medium is delivered to a heat exchanger 2325 where it is heated against the overhead gas stream. The rich aqueous absorbing medium is delivered to a heat exchanger 2342 where it is further heated against the regenerated aqueous lean absorbing medium and is subsequently fed into the regenerator 2344 by line 2346.

The mixed condensate stream is split into two streams 2319A and 2319B. The portion of the mixed condensate stream 2319A is delivered to a heat exchanger 2303 where it is heated against the incoming gas and is subsequently fed back into to the regenerator 2344. The portion of the mixed condensate stream 2319B is delivered to a heat exchanger 2302 where it is heated against the overhead gas stream. Steam condensate is removed from the steam reboiler 2348 in line 2368 and is fed to a flash drum 2308 that separates the flashed steam in line 2309 from the flashed steam condensate in line 2310. The portion of mixed condensate stream 2319B is delivered to a heat exchanger 2307 where it is further heated against the flashed steam in line 2309. At least a portion of the mixed condensate stream 2319B is recycled back to the regenerator 2344 in a vapor stream 2370 as previously described above.

Figure 24:
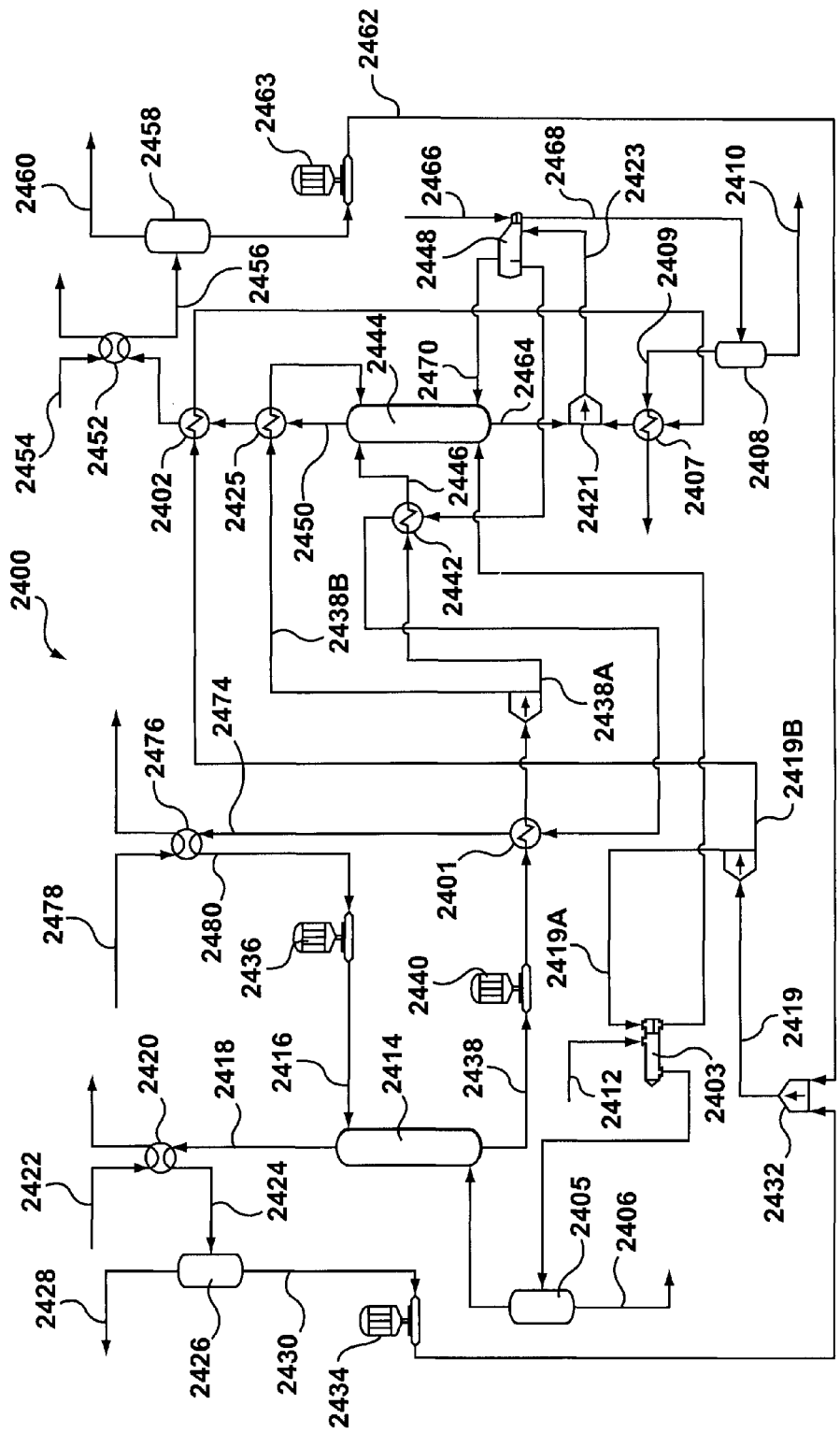
FIG. 24 is an apparatus for recovering a gaseous component from an incoming gas stream according to a twenty-third embodiment described in the specification.

FIG. 24 shows an apparatus 2400 for recovering carbon dioxide from an incoming gas stream according to a twenty-third embodiment described in the specification. The twenty-third embodiment is the same as the twenty-second embodiment, except as described in detail below.

In this embodiment, the rich aqueous absorbing medium is split immediately downstream of heat exchanger 2401 into two portions 2438A, 2438B.

A rich aqueous absorbing medium containing dissolved carbon dioxide is removed from the contact apparatus 2414 by line 2438 with pump 2440. The rich aqueous absorbing medium is delivered to a heat exchanger 2401 where it is heated against the regenerated lean aqueous absorbing medium. The rich aqueous absorbing medium is then split into two portions 2438A, 2438B. In one aspect, about 75% by volume can be diverted to portion 2438A and about 25% by volume can be diverted to portion 2438B. The portion of rich aqueous absorbing medium 2438A is delivered to a heat exchanger 2442 where it is further heated against the regenerated aqueous lean absorbing medium and is subsequently fed into the regenerator 2444. The portion of the rich aqueous absorbing medium 2438B is delivered to a heat exchanger 2425 where it is heated against the overhead gas stream and is subsequently fed into the regenerator 2444.

Figure 25:
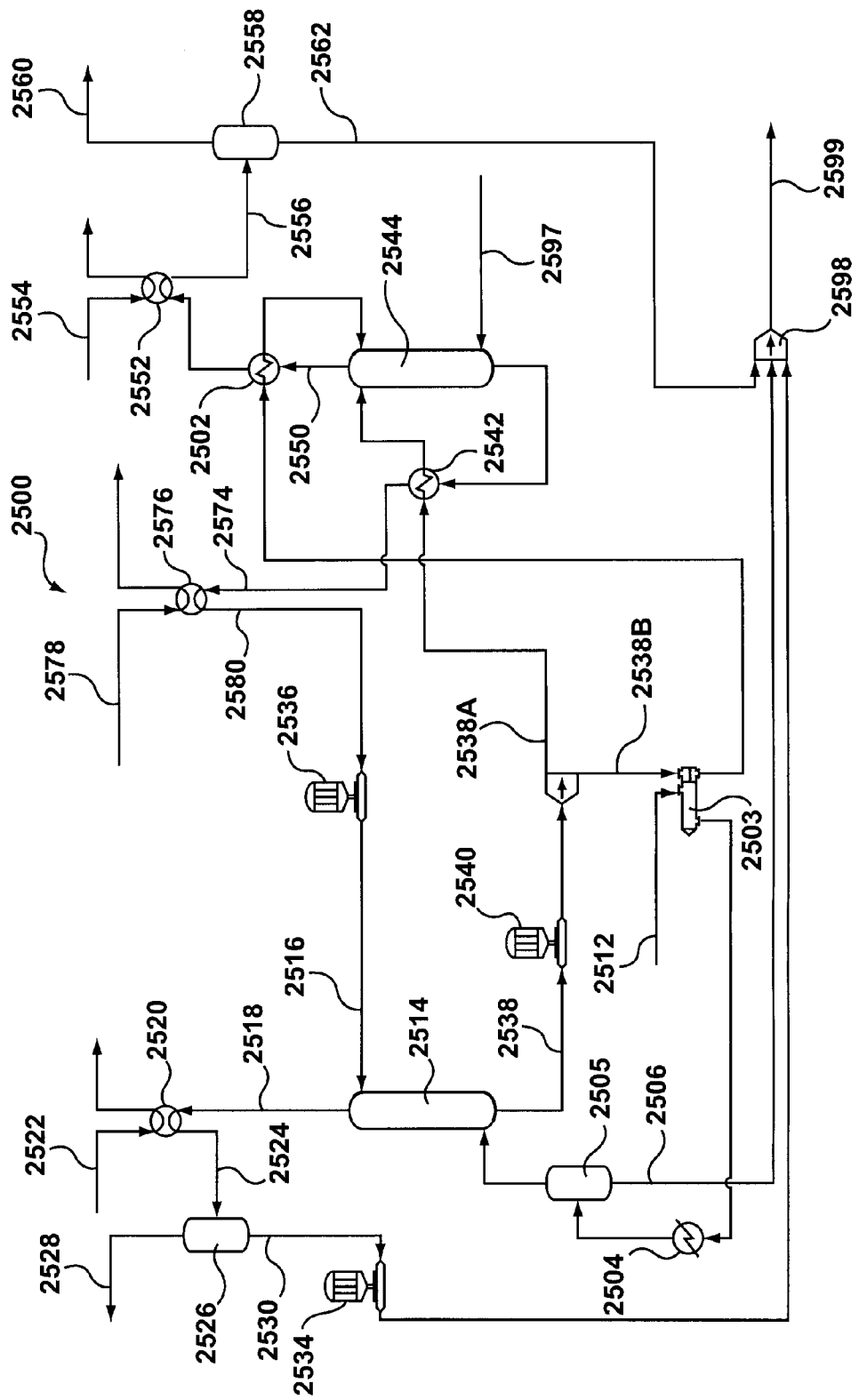
FIG. 25 is an apparatus for recovering a gaseous component from an incoming gas stream according to a twenty-fourth embodiment described in the specification.

FIG. 25 shows an apparatus 2500 for recovering carbon dioxide from an incoming gas stream according to a twenty-fourth embodiment described in the specification. The twenty-fourth embodiment is the same as the tenth embodiment, except as described in detail below.

In this embodiment, a reboiler is not used. Instead, a relatively low pressure steam (e.g., between about 30 to about 103 kPa) can be delivered directly to the regenerator 2544 as live steam injection 2597. This low pressure steam can be waste steam from another plant (e.g., a power generating plant) or some other low grade source of low pressure steam (e.g., heat recovery steam generators using hot flue gas, excess steam from heating plants, waste heat boilers, heat from carbon dioxide compression, etc.).

The condensate stream recovered from the overhead gas stream 2562, the condensate stream recovered from the lean treated gas stream 2530 and, if required, the condensate stream recovered from the incoming gas stream 2506 can be mixed 2598 and delivered back to the source of the low pressure steam (e.g., a boiler system) to maintain a water balance. If required, the condensate streams 2562, 2530, 2506 can be treated before being sent back to the source of the low pressure steam.

Figure 26:
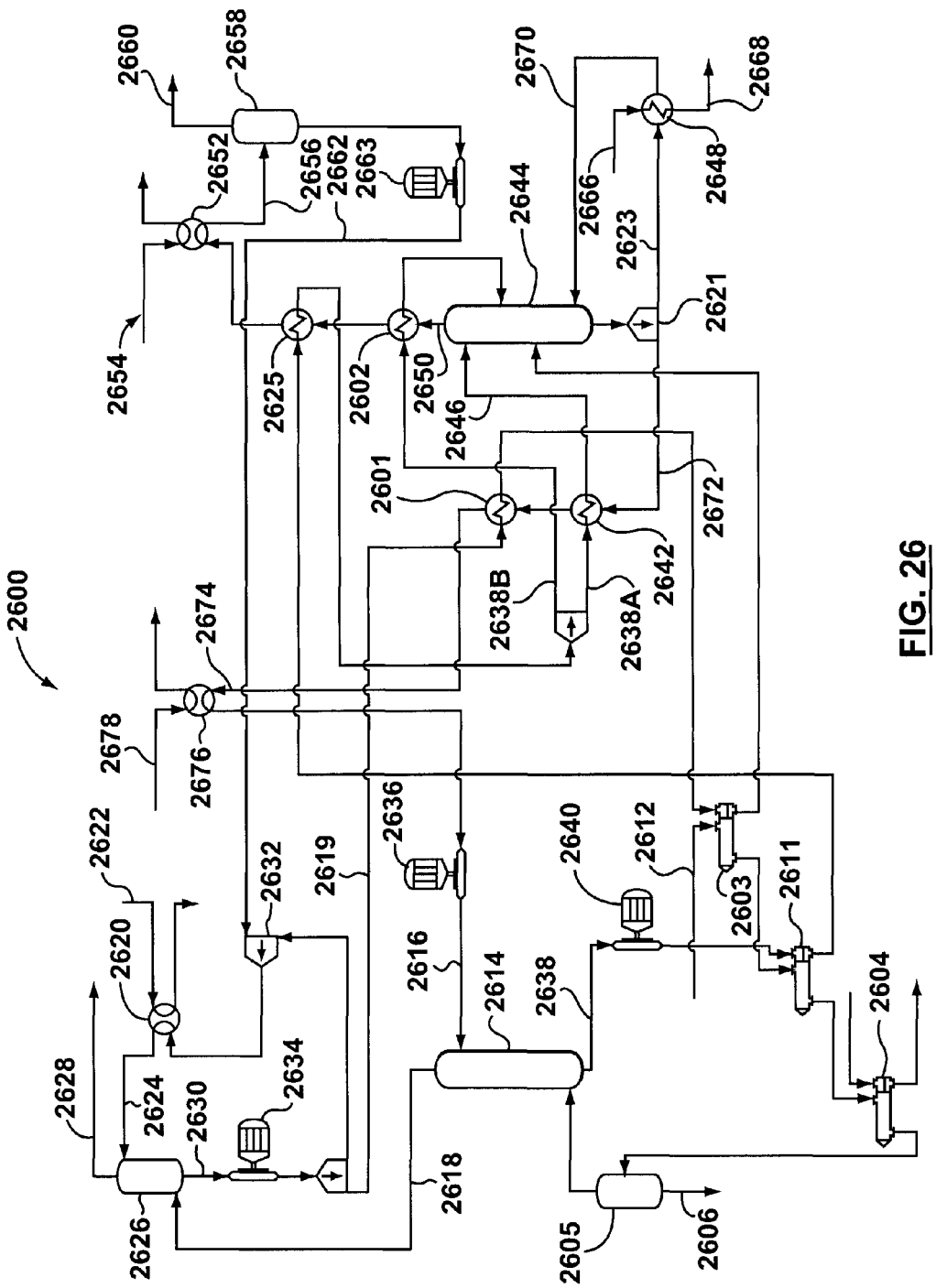
FIG. 26 is an apparatus for recovering a gaseous component from an incoming gas stream according to a twenty-fifth embodiment described in the specification.

FIG. 26 shows an apparatus 2600 for recovering carbon dioxide from an incoming gas stream according to a twenty-fifth embodiment described in the specification. The twenty-fifth embodiment is the same as the seventh embodiment, except as described in detail below.

In this embodiment, there is an additional heat exchanger 2625 to transfer more heat to the rich aqueous absorbing medium from the stripper overhead gas stream 2650 before being split with 10% of the absorbing medium stream 2638B to be further heated in the heat exchanger 2602 before entering the regenerator 2644. The remaining 90% of the rich absorbing medium of stream 2638A is sent to the heat exchanger 2642 where it is heated further by the lean aqueous absorbing medium before entering the regenerator 2644. Reflux condensate accumulated in vessel 2658 is mixed with the absorber overhead wash water at 2632 where the combined reflux and the condensed absorber overhead vapors are returned back to the process to be preheated in heat exchanger 2601 prior to entering heat exchanger 2603. In essence, the heat exchanger 2603 acts as an additional reboiler supplementing the existing steam reboiler 2648. If required, the apparatus can also include a cooler 2604 to further cool down the incoming gas stream and a flash drum 2605 to separate out the excess moisture in line 2606 from the incoming gas stream before entering the contact apparatus 2614.

A rich aqueous absorbing medium containing dissolved carbon dioxide is removed from the contact apparatus 2614 by line 2638 with pump 2640. The rich aqueous absorbing medium is delivered to a heat exchanger 2611 where it is heated against the incoming gas stream. The rich aqueous absorbing medium is then delivered to a heat exchanger 2625 where it is heated against the overhead gas stream 2650. The rich absorbing medium is then split with 10% of the stream 2638B delivered to a heat exchanger 2602 where it is heated against the overhead gas stream before entering the apparatus 2644. The remaining stream 2638B is heated against the lean aqueous absorbing medium in heat exchanger 2642 before it is delivered to the regenerator 2644 by line 2646.

A regenerated lean aqueous absorbing medium is removed from the regenerator 2644 where a portion in line 2623 is fed to the steam reboiler 2648 with the remaining fed to the heat exchanger 2642 by line 2672. Steam is fed to the steam reboiler in line 2666 and is removed in the form of a steam condensate in line 2668. Heat from the steam is transferred to the regenerated lean aqueous absorbing medium to form a vapor stream which is recycled back to the regenerator 2644 in line 2670. Lean aqueous absorbing medium from heat exchanger 2642 is fed to heat exchanger 2601 where it is further cooled by the process overhead condensate fed by line 2619. If required, the regenerated aqueous absorbing medium 2672 is delivered to a cooler 2676 fed by cooling water 2678 to reduce the temperature of the regenerated aqueous absorbing medium to a level that is acceptable for the contact apparatus 2614.

The combined reflux and absorber overhead condensate is preheated against a hot lean aqueous absorbing medium in heat exchanger 2601 by line 2619. The combined condensate is further heated in the flue gas heat exchanger 2603 where it is partially converted to steam vapors. The stream is then delivered to the regenerator 2644 providing additional regeneration energy as well as maintaining water balance within the process. This ultimately reduces the amount of steam required in the reboiler 2648.

It is to be appreciated that any type of aqueous absorbing medium to recover carbon dioxide and/or hydrogen sulfide from an incoming gas stream that is known in the art can be used in any of the novel apparatuses and methods described in this specification. The aqueous absorbing mediums can include, but are not limited to, monoethanolamine diethanol amine, triethanol amine, SELEXOL™ (a dimethyl ether of polyethylene glycol), di-isopropanol amine, 2-amino-2-methyl-1-propanol, piperazine, and sulfolane.

In a further aspect of the specification, an aqueous absorbing medium that can be used to recover carbon dioxide and/or hydrogen sulfide from an incoming gas stream is described in detail below. It is to be appreciated that the aqueous absorbing medium can be used both in the conventional apparatuses and methods know to a person skilled in the art or in any of the novel apparatuses and methods described in this specification.

The aqueous absorbing medium comprises monoethanolamine, methyldiethanolamine and a suitable solvent. Solvents that are suitable for the absorbing medium include those that solubilize the monoethanolamine and methyldiethanolamine and which act as an absorbent for carbon dioxide or hydrogen sulfide. Examples of suitable solvents include, but are not limited to, water, methanol, ethanol, and any combinations thereof. In one aspect, the molar ratio of monoethanolamine to methydiethanolamine is between about 1.5:1 to about 4:1 and the total molarity of monoethanolamine and methyldiethanolamine is between about 3 moles/liter to about 9 moles/liter. In yet a further aspect, the molar ratio of monoethanolamine to methydiethanolamine is about 2.5:1 and the total molarity of monoethanolamine and methyldiethanolamine is about 7 moles/liter.

In yet a further aspect of the specification, a method for producing an aqueous absorbing medium that can be used to recover carbon dioxide and/or hydrogen sulfide from an incoming gas stream is described. The method comprises the step of providing monoethanolamine, methyldiethanolamine, and a suitable solvent. The method further comprises the step of combining the monoethanolamine, the methyldiethanolamine and the solvent to form the aqueous absorbing medium. In one aspect, the monoethanolamine to methydiethanolamine is provided in a molar ratio of between about 1.5:1 to about 4:1 and the total molarity of monoethanolamine and methydiethanolamine is between about 3 moles/liter to about 9 moles/liter. In yet a further aspect, the molar ratio of monoethanolamine to methydiethanolamine is about 2.5:1 and the total molarity of monoethanolamine and methyldiethanolamine is about 7 moles/liter.

In yet a further aspect, a method for removing a gaseous component from an incoming gas stream is described. The method comprises contacting the incoming gas stream with an aqueous absorbing medium comprising monoethanolamine, methyldiethanolamine and a suitable solvent. In one aspect, the molar ratio of monoethanolamine to methydiethanolamine is between about 1.5:1 to about 4:1 and the total molarity of monoethanolamine and methyldiethanolamine is between about 3 moles/liter to about 9 moles/liter. In yet a further aspect, the molar ratio of monoethanolamine to methydiethanolamine is about 2.5:1 and the total molarity of monoethanolamine and methyldiethanolamine is about 7 moles/liter.

EXAMPLES

General Information Relating to Examples 1-32 and 35-38

Data was obtained through a plant experiment and computer simulations based on the International Test Center for Carbon Dioxide Capture (ITC) Multi-Purpose Technology Development $CO_2$ Capture Plant at the University of Regina, Regina, Saskatchewan, Canada. The plant is designed to produce 1 tonne of $CO_2$ per day from a flue gas obtained from a natural gas fired boiler. The incoming gas stream had the following composition on a 'wet basis' before any type of processing: 9.574 mole % $CO_2$, 0.909 mol % $O_2$, 72.285 mol % $N_2$, and 17.232 mol % $H_2O$. Furthermore, the incoming gas stream had the following conditions on a 'wet basis' before any processing: inlet gas pressure 95.36 kPa, inlet gas temperature 150° C., and inlet gas flow 10 kg-mol/hr. The incoming gas stream was processed to lower the temperature and remove excess moisture before entering the absorber. The processed incoming gas stream had the following composition: 11.169 mol % $CO_2$, 1.060 mol % $O_2$, 84.329 $N_2$, 3.442 $H_2O$. Furthermore, the processed incoming gas stream had the following conditions: inlet gas pressure 111.325 kPa, inlet gas temperature 36-40° C., inlet gas flow 8.57 kg-mol/hr. In Examples 1-32, the steam supply pressure to the reboiler was between a range of about 230-475 kPa, the steam supply temperature to the reboiler was between a range of about 125-150° C., and the reboiler temperature was about 121° C. The absorber efficiency was 90%. The computer simulations were prepared using PROMAX™ software obtained from Bryan Research & Engineering, Bryan, Tex., USA.

Examples 1-2

Example 1 was an actual plant experiment based on FIG. 1 that shows a prior art apparatus for recovering carbon dioxide from an incoming gas stream. Example 1 used an aqueous absorbing medium with a concentration of 5 mol/L MEA and a circulation rate of 14 L/min.

Example 2 was a computer simulation based on FIG. 1 that shows a prior art apparatus for recovering carbon dioxide from an incoming gas stream. Example 2 also used an aqueous absorbing medium with a concentration of 5 mol/L MEA and a circulation rate of 14 L/min.

In Example 1, the plant experiment resulted in a heat duty of 72,890 BTU/(lb-mol of $CO_2$ produced). In Example 2, the corresponding computer simulation resulted in a heat duty of 70,110 BTU/(lb-mol of $CO_2$ produced). This correlation shows that the computer simulations are capable of closely predicting the experimental results.

Examples 3-24

Examples 3-24 were computer simulations based on FIGS. 2-16 and 18-24, respectively. Examples 3-24 used an aqueous absorbing medium with a concentration of 5 mol/L MEA and a circulation rate of 14 L/min.

Examples 25-32

Examples 25-32 were computer simulations based on FIGS. 1, 2, 9, 12, 17, 22, 23, and 24 respectively. Examples 25-32 used an aqueous absorbing medium with a concentration of 5 mol/L MEA to 2 mol/L MDEA and a circulation rate of 12-13 L/min.

Experimental Results for Examples 1-32

The plant experimental results and computer simulation results for Examples 1-32 are shown in the Table below. The following is a list of explanations for the different column headings in the Table: the 'Heat Duty' column refers to the external heat required to operate the regenerator; the 'Lean Loading' column refers to the loading of $CO_2$ in the regenerated aqueous absorbing medium exiting the regenerator; the 'Rich Loading' column refers to the loading of $CO_2$ in the rich aqueous absorbing medium exiting the gas liquid contact apparatus; the '$CO_2$ Production' column refers to the recovered gaseous component; and the 'Steam Consumption' column refers to the steam required to operate the reboiler.

General Information Relating to Examples 33-34

Data was obtained through computer simulations based on the Boundary Dam coal fired power plant in Estevan, Saskatchewan. The plant is designed to produce 4 tonnes of $CO_2$ per day from a flue gas obtained from a coal fired power plant. As such, the incoming gas contained both carbon dioxide and sodium sulfide. Accordingly, the incoming gas was treated to lower the temperature and remove excess moisture and scrubbed to remove the sodium sulfide prior to entering the absorber. The incoming gas stream had the following composition: 14.86 mole % $CO_2$, 5.03 mol % $O_2$, 64.93 mol % $N_2$, and 15.18 mol % $H_2O$. Furthermore, the incoming gas stream had the following conditions: inlet gas pressure 111.325 kPa, inlet gas temperature 36° C., and inlet gas flow 10 kg-mol/hr. In Examples 33-34, the steam supply pressure to the reboiler was between a range of about 230-475 kPa, the steam supply temperature to the reboiler was between a range of about 125-150° C., and the reboiler temperature was about 121° C. The absorber efficiency was 90%. Examples 33-34 used an aqueous absorbing medium with a concentration of 5 mol/L MEA to 2 mol/L MDEA and a circulation rate of 12-13 L/min. The computer simulations were prepared using PROMAX™ software obtained from Bryan Research & Engineering, Bryan, Tex., USA.

Example 33

Example 33 was a computer simulation based on FIG. 9. The results for this computer simulation are as follows: 'Heat Duty' is 35,831 BTU/lb-mole; 'Lean Loading' is 0.3168 Mol $CO_2$/Mol aqueous absorbing medium; 'Rich Loading' is 0.4662 Mol $CO_2$/Mol aqueous absorbing medium; '$CO_2$ Production' 0.910 tonne/day; and 'Steam Consumption' is 0.896 kg/kg $CO_2$.

Example 34

Example 34 was a computer simulation based on FIG. 17. The results for this computer simulation are as follows: 'Heat Duty' is 14,716 BTU/lb-mole; 'Lean Loading' is 0.3085 Mol $CO_2$/Mol aqueous absorbing medium; 'Rich Loading' is 0.4687 Mol $CO_2$/Mol aqueous absorbing medium; '$CO_2$ Production' 0.913 tonne/day; and 'Steam Consumption' is 0.368 kg/kg $CO_2$.

Example 35

Example 35 was a computer simulation based on FIG. 25. Examples 35 used an aqueous absorbing medium with a concentration of 5 mol/L MEA and a circulation rate of 14 L/min. The results for this computer simulation are as follows: 'Heat Duty' is 40,500 BTU/lb-mole; 'Lean Loading' is 0.2609 Mol $CO_2$/Mol aqueous absorbing medium; 'Rich Loading' is 0.4766 Mol $CO_2$/Mol aqueous absorbing medium; '$CO_2$ Production' 0.912 tonne/day; and 'Steam Consumption' is 1.79 kg/kg $CO_2$.

Example 36

Example 36 was a computer simulation based on FIG. 25. Examples 36 used an aqueous absorbing medium with a concentration of 5 mol/L MEA to 2 mol/L MDEA and a circulation rate of 12-13 L/min. The results for this computer simulation are as follows: 'Heat Duty' is 49,500 BTU/lb-mole; 'Lean Loading' is 0.2622 Mol $CO_2$/Mol aqueous absorbing medium; 'Rich Loading' is 0.4528 Mol $CO_2$/Mol aqueous absorbing medium; '$CO_2$ Production' 0.911 tonne/day; and 'Steam Consumption' is 1.21 kg/kg $CO_2$.

Examples 37-38

Examples 37-38 were computer simulations and plant experiments based on FIG. 26. The results are shown in the Table below. Although particular embodiments of one or more inventions have been described in detail herein with reference to the accompanying drawings, it is to be understood that each claimed invention is not limited to those particular embodiments, and that various changes and modifications may be effected therein by one skilled in the art without departing from the scope or spirit of any invention as defined in the appended claims.

| Example | | Heat Duty (BTU/lb-mole) | Lean Loading (Mol $CO_2$/Mol aqueous absorbing medium) | Rich Loading (Mol $CO_2$/Mol aqueous absorbing medium) | $CO_2$ Production (tonne/day) | Steam Consumption (kg/kg $CO_2$) |
|---|---|---|---|---|---|---|
| 1 | | 72,890 | 0.2587 | 0.4588 | 0.847 | 1.80 |
| 2 | | 70,114 | 0.2699 | 0.4819 | 0.917 | 1.75 |
| 3 | | 55,888 | 0.2725 | 0.4828 | 0.910 | 1.40 |
| 4 | | 63,297 | 0.2699 | 0.4819 | 0.917 | 1.58 |
| 5 | | 60,768 | 0.2704 | 0.4821 | 0.916 | 1.52 |
| 6 | | 60,367 | 0.2709 | 0.4811 | 0.909 | 1.51 |
| 7 | | 60,047 | 0.2693 | 0.4816 | 0.919 | 1.50 |
| 8 | | 57,860 | 0.2698 | 0.4806 | 0.912 | 1.45 |
| 9 | | 57,426 | 0.2692 | 0.4816 | 0.919 | 1.44 |
| 10 | | 57,400 | 0.2691 | 0.4816 | 0.919 | 1.44 |
| 11 | | 55,982 | 0.2700 | 0.4819 | 0.917 | 1.40 |
| 12 | | 57,222 | 0.2692 | 0.4804 | 0.914 | 1.43 |
| 13 | | 55,777 | 0.2700 | 0.4807 | 0.912 | 1.40 |
| 14 | | 62,188 | 0.2723 | 0.4828 | 0.910 | 1.56 |
| 15 | | 49,224 | 0.2696 | 0.4805 | 0.912 | 1.20 |
| 16 | | 48,432 | 0.2678 | 0.4798 | 0.917 | 1.18 |
| 17 | | 32,422 | 0.2693 | 0.4803 | 0.913 | 0.79 |
| 18 | | 52,768 | 0.2708 | 0.4809 | 0.909 | 1.32 |
| 19 | | 55,766 | 0.2698 | 0.4805 | 0.912 | 1.40 |
| 20 | | 55,763 | 0.2698 | 0.4805 | 0.912 | 1.40 |
| 21 | | 50,485 | 0.2696 | 0.4805 | 0.912 | 1.26 |
| 22 | | 21,041 | 0.2709 | 0.4816 | 0.912 | 0.526 |
| 23 | | 18,372 | 0.2714 | 0.4826 | 0.914 | 0.460 |
| 24 | | 16,812 | 0.2716 | 0.4754 | 0.913 | 0.421 |
| 25 | | 49,030 | 0.2888 | 0.4604 | 0.912 | 1.23 |
| 26 | | 42,713 | 0.2776 | 0.4626 | 0.910 | 1.07 |
| 27 | | 39,511 | 0.2894 | 0.4607 | 0.911 | 0.988 |
| 28 | | 39,575 | 0.2850 | 0.4563 | 0.912 | 0.990 |
| 29 | | 5,778 | 0.2751 | 0.4606 | 0.913 | 0.145 |
| 30 | | 12,663 | 0.2664 | 0.4596 | 0.909 | 0.317 |
| 31 | | 12,126 | 0.2811 | 0.4594 | 0.910 | 0.303 |
| 32 | | 7,354 | 0.2751 | 0.4606 | 0.913 | 0.184 |
| 37 | Sim. | 55,590 | 0.2504 | 0.4837 | 0.57 | 1.30 |
|  | Exp. | 48,924 ± 5436 | 0.2270 | 0.5024 | 0.58 | 1.21 ± 0.14 |
| 38 | Sim. | 43,733 | 0.2321 | 0.4222 | 0.53 | 1.04 |
|  | Exp. | 39231 ± 5117 | 0.1835 | 0.4252 | 0.58 | 0.98 ± 0.17 |

We claim:

1. A method for recovering a gaseous component from an incoming gas stream, comprising:
    a) flowing the incoming gas stream through a gas-liquid contact apparatus wherein the incoming gas stream is contacted with a cooled lean aqueous absorbing medium thereby transferring at least a portion of the gaseous component from the incoming gas stream to the aqueous absorbing medium thereby forming a lean treated gas stream and a rich aqueous absorbing medium;
    b) conveying the rich aqueous absorbing medium from the gas-liquid contact apparatus to a regenerator, the rich aqueous absorbing medium being heated by passage through a first heat-exchanger interposed the gas-liquid contact apparatus and the regenerator;
    c) at an elevated temperature in the regenerator, desorbing at least a portion of the gaseous component from the heated rich aqueous absorbing medium at a temperature to form a heated overhead gas stream comprising the gaseous component and a heated regenerated lean aqueous absorbing medium;
    d) conveying the a heated regenerated lean aqueous absorbing medium from the regenerator to the gas-liquid contact apparatus by passage through the first heat-exchanger wherein at least a portion of the heat is recovered from the regenerated lean aqueous absorbing medium thereby producing a partially cooled regenerated lean aqueous absorbing medium;
    e) flowing the heated overhead gas stream through a second heat exchanger to recover a heated stream and a cooled first condensate therefrom; and
    f) commingling the cooled condensate with the partially cooled regenerated lean aqueous absorbing medium thereby providing a cooled lean aqueous absorbing medium to the gas-liquid contact apparatus.

2. A method according to claim 1, wherein prior to flowing the incoming gas stream into the gas-liquid contact apparatus, heat is transferred from the incoming gas stream to the cooled first condensate recovered from the overhead gas stream.

3. A method according to claim 1, wherein the heated stream is flowed through a condenser to recover therefrom a carbon dioxide rich gas stream.

4. A method according to claim 1, further comprising the steps of introducing steam to provide heat for the desorbing step and to form a steam condensate and flashing the steam condensate to form a flashed steam and wherein heat is transferred from the flashed steam to the heated stream.

5. A method according to claim 1, wherein heat is transferred from the regenerated aqueous absorbing medium to the heated stream.

6. A method according to any one of claims 1 to 5, wherein the regenerated lean aqueous absorbing medium is combined with the first condensate stream.

7. A method according to any one of claims 1 to 5, wherein the regenerated lean aqueous absorbing medium combined with at least a portion of the first condensate stream and at least a portion of a second condensate stream recovered from the lean treated gas stream.

8. A method according to any one of claims 1 to 5, wherein the regenerated lean aqueous absorbing medium is combined with at least a portion of the first condensate stream and at least a portion of the second condensate stream and at least a portion of a third condensate stream recovered from the partially cooled regenerated lean aqueous absorbing medium.

9. A method according to claim 1, wherein heat is transferred from the incoming gas stream to at least one of the rich aqueous absorbing medium or the semi-lean aqueous absorbing medium.

10. A method according claim 1, wherein heat is transferred from the overhead gas stream to at least one of the rich aqueous absorbing medium or the semi-lean aqueous absorbing medium.

11. A method according to claim 1, further comprising the steps of introducing steam to provide heat for the desorbing step and to form a steam condensate and flashing the steam condensate to form a flashed steam and wherein heat is transferred from the flashed steam to at least one of the rich aqueous absorbing medium or the semi-lean aqueous absorbing medium.

12. A method according to claim 1, wherein heat is transferred from the regenerated aqueous absorbing medium to at least one of the rich aqueous absorbing medium or the semi-lean aqueous absorbing medium.

13. A method according to claim 1, wherein the heated rich aqueous absorbing medium comprises a first rich aqueous absorbing medium portion and a second rich aqueous absorbing medium portion derived by delivering at least a portion of the first condensate stream to the contacting step so that at least a portion of the first condensate stream combines with the lean aqueous absorbing medium to form the rich aqueous absorbing medium which is subsequently split into the first rich aqueous medium portion and the second rich aqueous absorbing medium portion.

14. A method according to claim 13, wherein heat is transferred from the incoming gas stream to at least one of the rich aqueous absorbing medium, the first rich aqueous absorbing medium portion or the second rich absorbing medium portion.

15. A method according to claim 13, wherein heat is transferred from the overhead gas stream to at least one of the rich aqueous absorbing medium, the first rich aqueous absorbing medium portion or the second rich absorbing medium portion.

16. A method according to claim 13, further comprising the steps of introducing steam to provide heat for the desorbing step and to form a steam condensate and flashing the steam condensate to form a flashed steam and wherein heat is transferred from the flashed steam to at least one of the rich aqueous absorbing medium, the first rich aqueous absorbing medium portion or the second rich absorbing medium portion.

17. A method according to claim 13, wherein heat is transferred from the regenerated aqueous absorbing medium to at least one of the rich aqueous absorbing medium, the first rich aqueous absorbing medium portion or the second rich absorbing medium portion.

18. A method according to claim 1, further comprising the step of treating at least a portion of the lean treated gas stream to recover a second condensate stream and wherein the heated stream comprises a first mixed condensate stream portion and a second mixed condensate stream portion derived by combining at least a portion of the first condensate stream with at least a portion of the second condensate stream to form the mixed condensate stream and subsequently splitting the mixed condensate stream to form the first mixed condensate stream portion and the second mixed condensate stream portion.

19. A method according to claim 18, wherein heat is transferred from the incoming gas stream to at least one of the mixed condensate stream, the first mixed condensate stream portion or the second mixed condensate stream portion.

20. A method according claim 18, wherein heat is transferred from the overhead gas stream to at least one of the mixed condensate stream, the first mixed condensate stream portion or the second mixed condensate stream portion.

21. A method according to claim 18, further comprising the steps of introducing steam to provide heat for the desorbing step and to form a steam condensate and flashing the steam condensate to form a flashed steam and wherein heat is transferred from the flashed steam to at least one of the mixed condensate stream, the first mixed condensate stream portion or the second mixed condensate stream portion.

22. A method according to claim 18, wherein heat is transferred from the regenerated aqueous absorbing medium to at least one of the mixed condensate stream, the first mixed condensate stream portion or the second mixed condensate stream portion.

23. A method according to claim 1, wherein the incoming gas stream is a combustion exhaust gas.

24. A method according to claim 1, wherein the gaseous component comprises one or more of carbon dioxide, hydrogen sulphide, sulphur dioxide, chlorine and ammonia.

25. A method according to claim 1, wherein the gaseous component comprises carbon dioxide.

26. A method according to claim 1, wherein the lean aqueous absorbing medium comprises a mixture of monoethanolamine, methyldiethanolamine, and a solvent selected from a group consisting of water, methanol, ethanol, and combinations thereof.

27. A method according to claim 26, wherein the molar ratio of monoethanolamine to methydiethanolamine is between about 1.5:1 to about 4:1 and the total molarity of monoethanolamine and methyldiethanolamine is between about 3 moles/liter to about 9 moles/liter.

28. A method according to claim 27, wherein the molar ratio of monoethanolamine to methydiethanolamine is about 2.5:1 and the total molarity of monoethanolamine and methyldiethanolamine is about 7 moles/liter.

* * * * *